US012065527B2

(12) United States Patent
Varnell et al.

(10) Patent No.: US 12,065,527 B2
(45) Date of Patent: Aug. 20, 2024

(54) AQUEOUS GLYOXALATED POLYACRYLAMIDE COMPOSITION

(71) Applicant: SOLENIS TECHNOLOGIES, L.P., Wilmington, DE (US)

(72) Inventors: Daniel F. Varnell, Wilmington, DE (US); Richard J. Riehle, Wilmington, DE (US)

(73) Assignee: Solenis Technologies, L.P., Wilmington, DE (US)

( * ) Notice: Subject to any disclaimer, the term of this patent is extended or adjusted under 35 U.S.C. 154(b) by 102 days.

(21) Appl. No.: 17/646,896

(22) Filed: Jan. 4, 2022

(65) Prior Publication Data

US 2022/0213308 A1    Jul. 7, 2022

Related U.S. Application Data

(60) Provisional application No. 63/133,449, filed on Jan. 4, 2021.

(51) Int. Cl.
| | | |
|---|---|---|
| *C08F 220/60* | (2006.01) | |
| *C08F 8/28* | (2006.01) | |
| *D21H 17/45* | (2006.01) | |
| *D21H 21/20* | (2006.01) | |

(52) U.S. Cl.
CPC .............. *C08F 220/60* (2013.01); *C08F 8/28* (2013.01); *D21H 17/455* (2013.01); *D21H 21/20* (2013.01)

(58) Field of Classification Search
CPC ........ C08F 220/60; C08F 8/28; C08F 220/56; C08F 20/54; C08F 20/56; D21H 17/455; D21H 21/20; D21H 17/375
See application file for complete search history.

(56) References Cited

U.S. PATENT DOCUMENTS

| | | | |
|---|---|---|---|
| 3,556,932 A | 1/1971 | Coscia et al. | |
| 3,597,313 A | 8/1971 | Williams et al. | |
| 4,603,176 A | 7/1986 | Bjorkquist et al. | |
| 4,605,702 A | 8/1986 | Guerro et al. | |
| 4,954,538 A | 9/1990 | Dauplaise et al. | |
| 5,320,711 A | 6/1994 | Dauplaise et al. | |
| 5,723,022 A | 3/1998 | Dauplaise et al. | |
| 6,379,499 B1 | 4/2002 | Yang et al. | |
| 6,818,101 B2 | 11/2004 | Vinson et al. | |
| 7,034,087 B2 | 4/2006 | Hagiopol et al. | |
| 7,119,148 B2 | 10/2006 | Hagiopol et al. | |
| 7,125,469 B2 | 10/2006 | Barcus et al. | |
| 7,488,403 B2 | 2/2009 | Hagiopol et al. | |
| 7,608,665 B2 | 10/2009 | Proverb et al. | |
| 7,625,989 B2 | 12/2009 | Barcus et al. | |
| 7,641,766 B2 | 1/2010 | St. John et al. | |
| 7,678,232 B2 | 3/2010 | Shannon et al. | |
| 7,727,359 B2 | 6/2010 | Proverb et al. | |
| 7,828,934 B2 | 11/2010 | Cyr et al. | |
| 7,863,395 B2 | 1/2011 | Hagiopol et al. | |
| 7,875,676 B2 | 1/2011 | Wright | |
| 7,897,013 B2 | 3/2011 | Hagiopol et al. | |
| 7,901,543 B2 | 3/2011 | St. John et al. | |
| 7,964,669 B2 | 6/2011 | Proverb et al. | |
| 8,097,125 B2 | 1/2012 | Ryan et al. | |
| 8,222,343 B2 | 7/2012 | Wright | |
| 8,288,502 B2 | 10/2012 | Bode et al. | |
| 8,435,382 B2 | 5/2013 | Lu et al. | |
| 8,703,847 B2 | 4/2014 | Wright | |
| 8,753,480 B2 | 6/2014 | Bode et al. | |
| 8,771,469 B2 | 7/2014 | Cyr et al. | |
| 8,920,606 B2 | 12/2014 | Wright | |
| 8,979,381 B2 | 3/2015 | Edelmann et al. | |
| 9,121,137 B2 | 9/2015 | Viazmensky et al. | |
| 9,562,326 B2 | 2/2017 | Lu et al. | |
| 9,637,865 B2 | 5/2017 | Rosencrance et al. | |
| 9,644,320 B2 * | 5/2017 | Wright | .................. D21H 17/55 |
| 2005/0187356 A1 * | 8/2005 | Hagiopol | .................. C08F 8/28 526/303.1 |
| 2006/0142535 A1 * | 6/2006 | Cyr | ........................ C08F 220/56 162/168.3 |
| 2014/0336314 A1 | 11/2014 | Benz et al. | |
| 2016/0201269 A1 | 7/2016 | Wright | |

FOREIGN PATENT DOCUMENTS

CA    2827964 A1    8/2005

OTHER PUBLICATIONS

ISA/US, International Search Report issued in International Application No. PCT/US2022/070010, dated Jun. 3, 2022.

* cited by examiner

*Primary Examiner* — Jane L Stanley
(74) *Attorney, Agent, or Firm* — Lorenz & Kopf, LLP

(57) ABSTRACT

An aqueous composition includes water and a cationic polymeric resin having at least one reactive aldehyde group and formed from the reaction of glyoxal and a polymer. The polymer comprises at least one acrylamide repeating unit and at least one cationic repeating unit wherein a number of reactive aldehyde equivalents divided by a number of equivalents of residual glyoxal based on the total weight of the polymer is greater than about 1.2, wherein prior to reaction the polymer has greater than about 50 mole % acrylamide repeat units and from about 2 to about 30 mole % cationic repeating units, wherein greater than about 5 mole % of the acrylamide repeating units are converted to reactive aldehyde groups in the cationic polymer resin; and wherein the composition exhibits a viscosity gain of less than about 200%.

8 Claims, No Drawings

AQUEOUS GLYOXALATED POLYACRYLAMIDE COMPOSITION

CROSS-REFERENCE TO RELATED APPLICATIONS

This application claims the benefit of U.S. Provisional Application No. 63/133,449, filed Jan. 4, 2021, the disclosure of which is expressly incorporated herein by reference in its entirety.

TECHNICAL FIELD

This disclosure generally relates to an aqueous composition that includes a glyoxalated polyacrylamide (GPAM) polymer. More specifically, this disclosure relates to a composition wherein there is a higher level of formed aldehyde functionality on the GPAM polymer, less inter molecular crosslinks between initial cationic acrylamide polymer chains, and less glyoxal in the final composition.

BACKGROUND

Glyoxalated polyacrylamide (GPAM) resins have been used for many years in the paper industry to impart temporary wet strength, wet strength, dry strength to the final papers. They are also known to improve water drainage during the paper making process. However, not all GPAM resins are efficient at imparting wet strength to paper and none are known that match the wet strength imparted by other wet-strength chemistries such as polyamidoamine-epichlorohydrin (PAE) resins. Various resins and their efficiencies are described in numerous references such as Principles of Wet End Chemistry by William Scott, Tappi Press or Espy, H. H. (1995). "The mechanism of wet-strength development in paper—A review," Tappi Journal 78(4), 90-99. Whereas PAE resins are highly efficient at imparting wet strength, they provide wet strength that is permanent, i.e., the wet strength of the paper does not decrease over time when held in a wet state. GPAM resins can offer what is known as temporary wet strength which means the strength of the wetted paper declines over time. There is therefore a need for a temporary wet-strength resin that provides initial wet strength of a level similar to or greater than the wet strength of PAE or other permanent wet-strength resins.

GPAM resins are typically formed by the reaction of glyoxal with acrylamide groups of a polymer made from acrylamide-based monomers and ionic monomers. Final GPAM resins typically include reactive aldehyde functionality pendent on the polymer. They also typically include excess unreacted glyoxal. For the purpose of this patent "GPAM resin" will refer to the compositions of the patent which comprises GPAM and glyoxal and "GPAM" will refer solely to the glyoxalated acrylamide polymers that are formed. Typically, a high level of reactive aldehyde functionality pendent on the polymer, hereafter referred to as polymer or GPAM aldehyde functionality or aldehyde functionality on the GPAM, cannot be generated in a GPAM resin because, during more extensive glyoxalation, there is a large increase of viscosity and possibly gelation. Furthermore, some GPAM resins have high levels of residual glyoxal making them unsuitable for use. There exists the need for a GPAM resin that can have a low level of residual glyoxal and yet high reactivity.

GPAM resins tend to react slowly over time within water compositions. Aldehyde functionality of the GPAM resins tends to continue to react with open acrylamide groups to form crosslinks and increase the viscosity of the water compositions. The GPAM resin may even continue to react to form a gelled composition which leads to decreased product efficacy and ease of use.

Maintenance of pendent aldehyde functionality of the GPAM and or no or minimal increase of the viscosity of a GPAM resin composition during ageing is described as shelf-life. Commercial GPAM resins may have a shelf life of only about 30 days at about 32° C. The viscosity increases over that time until the product is not easily usable. For traditional GPAM resins, an increase of the solids of the final water composition or increase of the level of GPAM functionality or an increase of the storage temperature can shorter the shelf life. Accordingly, there remains a need for a high aldehyde functional GPAM composition at a relatively high concentration, such as greater than 10% solids, that does not contain excess high levels of glyoxal and that is stable over time.

GPAM resins, with their aldehyde functionality, provide initial wet strength to paper when the paper is prepared at a pH of about 5.5 to 7. Efficiency is reduced when to paper making process is done at a higher pH. Accordingly, there also remains a need for a GPAM resin with good efficiency for wet-strength development at neutral or even alkaline paper making conditions.

Even further, as GPAM resins are formed, glyoxal is reacted with the acrylamide groups of an acrylamide base polymer. The reaction is typically carried out at a pH of about 8 or 9.7 or 10, and at a concentration useful for use as a final product, such as 10% solids. In such cases, the viscosity of the reaction is monitored to determine the stopping point so the GPAM contains reactive functional aldehyde groups and is not overly crosslinked, which raises viscosity and lowers shelf life. The process of monitoring viscosity places demands on the manufacturing plant. If the reaction is not monitored, it can form a gel in a reaction vessel which then causes a loss of productivity. For this reason, there also remains a need for a GPAM resin formation reaction that is stable over time such that the possibility of a gel formulation in the reaction vessel is greatly reduced and there is not as much of a need to monitor the reaction viscosity to determine the stopping point of the reaction.

BRIEF SUMMARY

This disclosure provides an aqueous composition that includes water and a cationic polymeric resin having at least one reactive aldehyde group and formed from the reaction of glyoxal and a polymer. The polymer comprises at least one acrylamide repeating unit and at least one cationic repeating unit wherein a number of reactive aldehyde equivalents divided by a number of equivalents of residual glyoxal based on the total weight of the polymer is greater than about 1.2, preferably greater than about 1.5, preferably greater than about 2 wherein prior to reaction the polymer can have greater than about 50 mole % acrylamide repeat units and from about 2 to about 30 mole % cationic repeating units, wherein greater than about 5 mole % of the acrylamide repeating units of the polymer are converted to reactive aldehyde groups in the cationic polymer resin.

This disclosure also provides a process for preparation an aqueous composition comprising water and a cationic polymer, the method comprising the steps of:

polymerizing two or more monomers via free radical polymerization to form a polymer comprising at least one acrylamide repeating unit and at least one cationic repeating unit;

reacting the acrylamide groups of the polymer with glyoxal to form a cationic polymer resin having pendent reactive aldehyde groups and optionally removing excess glyoxal, to form the aqueous composition;

wherein a number of reactive aldehyde equivalents formed on the polymer divided by a number of equivalents of residual glyoxal based on the total weight of the polymer is greater than about 1.2.

wherein the step of reacting the polymer and the glyoxal occurs by the addition of a water mixture of the polymer to a solution of the glyoxal such that greater than 50, 65, or 80 mole % of the polymer-glyoxal reaction that occurs does so before 100% of the polymer in the polymer mixture is added to the glyoxal in the solution; wherein a percentage of polymer-glyoxal reaction is defined as about the maximum percentage of acrylamide groups that react after about 8 hours of reaction time with glyoxal at about 22° C. and a pH of about 8.9, wherein the reaction of the polymer and the glyoxal is continued after about 100% of the polymer in the solution is added to reach a level of glyoxalation such that at least 20 mole % of the acrylamide repeating units of the polymer are converted to reactive aldehyde groups and wherein less viscosity increase occurs during the polymer-glyoxal reaction than if the solution of the glyoxal was added to the solution of the polymer, and wherein the composition exhibits a viscosity gain of less than about 50% when measured at about 10% solids and a pH of about 3.5 after ageing at about 40° C. for about 30 days.

This disclosure also provides a process of forming paper, the process comprising the steps of:

providing an aqueous suspension of cellulosic fibers;
adding an aqueous composition to the suspension, wherein the aqueous composition comprises:
water; and
a cationic polymeric resin having at least one reactive aldehyde group and formed from the reaction of glyoxal and a polymer;
wherein the polymer comprises at least one acrylamide repeating unit and at least one cationic repeating unit;
wherein a number of reactive aldehyde equivalents divided by a number of equivalents of residual glyoxal based on the total weight of the polymer is greater than about 1.2;
wherein prior to reaction the polymer has greater than about 50 mole % acrylamide repeat units and from about 2 to about 30 mole % cationic repeating units;
wherein greater than about 5 mole % of the acrylamide repeating units of the polymer are converted to reactive aldehyde groups in the cationic polymer resin; and
wherein the composition exhibits a viscosity gain of less than about 200% when measured at about 10% solids and a pH of about 3.2 after ageing at about 40° C. for about 30 days;
forming the cellulosic fibers into a sheet; and
drying the sheet to produce a paper having an initial wet tensile strength that is at least about 10%, about 15%, about 20%, about 25%, or about 30%, greater than a comparative paper when only about 15 mole % of the at least one acrylamide repeating units is converted to reactive aldehyde groups.

DETAILED DESCRIPTION

The following detailed description is merely exemplary in nature and is not intended to limit the compositions or methods described herein. Furthermore, there is no intention to be bound by any theory presented in the preceding background or the following detailed description. All of the values described herein may alternatively be described as approximate values, e.g. ±0.1, 0.5, 1, 5, 10, 15, or even 20%, or any value or range of values therebetween. Moreover, in various non-limiting embodiments, it is expressly contemplated that all values and ranges of values, both whole and fractional, including and between those sets forth herein are expressly contemplated for use.

Embodiments of the present disclosure are generally directed to GPAM compositions and methods for fabricating the same. For the sake of brevity, conventional techniques related to GPAM resins may not be described in detail herein. Moreover, the various tasks and process steps described herein may be incorporated into a more comprehensive procedure or process having additional steps or functionality not described in detail herein. In particular, various steps in the manufacture of GPAM resins are well-known and so, in the interest of brevity, many conventional steps tend to only be mentioned briefly herein or tend to be omitted entirely without providing the well-known process details. In various embodiments, the terminology "solution" is used herein and may be described as a mixture wherein a compound is at least 97% soluble. In other embodiments, a solution may mean that no separated phase that refracts visible light exists where there is a difference of refractive index between phases. In still other non-limiting embodiments, the terminology solution as used herein may be replaced with mixture.

In one embodiment, this disclosure provides an aqueous composition includes water and a cationic polymeric resin having at least one reactive aldehyde group and formed from the reaction of glyoxal and a polymer. The polymer comprises at least one acrylamide repeating unit and at least one cationic repeating unit wherein a number of reactive aldehyde equivalents divided by a number of equivalents of residual glyoxal based on the total weight of the polymer is greater than about 1.2, wherein prior to reaction the polymer can have greater than about 50 mole % acrylamide repeat units and from about 5 to about 30 mole % cationic repeating units, wherein greater than about 20 mole % of the acrylamide repeating units of the polymer are converted to reactive aldehyde groups in the cationic polymer resin; and wherein the composition typically exhibits a viscosity gain of less than about 200% when measured at about 10% solids and a pH of about 3.2 after ageing at about 40° C. for about 30 days.

This disclosure also provides an aqueous composition that includes water and a cationic polymeric resin having at least one pendent reactive aldehyde group and formed from the reaction of glyoxal and a polymer. This polymer may be described as a "pre-polymer" throughout this disclosure and is differentiated from the final cationic polymeric resin. For example, the cationic polyacrylamide (prepolymer) before reaction with glyoxal is different from the glyoxalated cationic polymer. The polymer comprises at least one acrylamide repeating unit and at least one cationic repeating unit wherein a number of reactive aldehyde equivalents divided by a number of equivalents of residual glyoxal based on the total weight of the polymer is greater than about 1.2, wherein prior to reaction the polymer can have greater than about 50 mole % acrylamide repeat units and from about 5 to about 30 mole % cationic repeating units, wherein greater than about 20 mole % of the acrylamide repeating units of the polymer are converted to reactive aldehyde groups in the cationic polymer resin; optionally wherein the composition has a solids content of at least about 4 wt %, and wherein the composition exhibits a viscosity gain of less than about 200% when measured at about 10% solids and a pH of about 3.2 after ageing at about 40° C. for about 30 days.

In one embodiment, the polymer comprises at least one acrylamide repeating unit and at least one cationic repeating unit wherein a number of reactive aldehyde equivalents divided by a number of equivalents of residual glyoxal based on the total weight of the polymer is greater than about 1.2, preferably greater than about 1.5, preferably greater than about 2 wherein prior to reaction the polymer can have greater than about 50 mole % acrylamide repeat units and from about 2 to about 30 mole % cationic repeating units, wherein greater than about 5 mole % of the acrylamide repeating units of the polymer are converted to reactive aldehyde groups in the cationic polymer resin; optionally wherein the composition has a solids content of at least about 1 wt %, and wherein the composition exhibits a viscosity gain of less than about 200% when measured at a pH of about 3.2 after ageing at about 25° C. for about 30 days. For the purpose of this disclosure, the terms "reactivity", "aldehyde reactivity", "reactive aldehyde", "reactive aldehyde functionality", "reactive aldehyde group", "functional aldehyde group", "pendent reactive aldehyde group", "pendent polymer aldehyde group" and "pendent reactive aldehyde functionality" may be used interchangeably and indicate pendent reactive aldehyde functionality on the glyoxalated polyacrylamide.

The present disclosure, in one embodiment, generally relates to compositions of a glyoxalated cationic polymer acrylamide (GPAM) resin where there is a higher level of formed aldehyde functionality on the GPAM polymer, less inter molecular crosslinks between the initial cationic acrylamide polymer chains, and at the same time less glyoxal in the final mixture. In addition, the GPAM resin compositions of this disclosure when used in making paper provides to the paper made greater initial wet strength (WS) and greater overall WS decay over time compared to GPAM resins with compositions where there is not the same level of aldehyde functionality and lack of crosslinking. In addition, the GPAM resin compositions of this disclosure may have better ageing stability. In another embodiment, the processes for preparing the present compositions are defined. In the process there is a greatly reduced possibility of gelation or excess viscosity increase occurring than in previous processes.

In other non-limiting embodiments, aqueous compositions that optionally have at least 4% solids of GPAM resins are disclosed wherein the GPAM of the compositions has pendent reactive aldehyde groups formed from the reaction of glyoxal and a polymer wherein the polymer comprises at least one acrylamide repeating unit and at least one cationic repeating unit where the mole percentage of the acrylamide repeating units is at least 50 and the mole percentage of cationic repeating units is between 5 and 30, and where the equivalents of reactive aldehyde groups of the GPAM (moles of pendent reactive aldehyde groups per grams of GPAM polymer) divided by the equivalents of residual glyoxal (moles of unreacted glyoxal per grams of GPAM polymer) in the composition is greater than about 1.2 and where at least 20 mole % of the acrylamide repeating units of the polymer are converted to the pendent reactive aldehyde groups and where on ageing of the aqueous composition at about pH 3.2 and at 40° C. and at 10% solids for 30 days causes less than about a 200% increase of viscosity. In other embodiments, there is disclosed a cationic GPAM resin composition with high reactivity, a low level of residual glyoxal, and excellent ageing stability. The high reactivity can be such that 30 or 40% of the acrylamide groups of the starting polymer are converted to pendent reactive aldehyde functionality. Furthermore, about 40 mole %, about 50 mole %, or about 60 mole %, of the acrylamide repeating units of the polymer react with glyoxal. Some of the reactions form pendent reactive aldehyde functionality and others form inter or intramolecular crosslinks.

In other non-limiting embodiments, aqueous compositions that optionally have at least 1% solids of GPAM resins are disclosed wherein the GPAM of the compositions has pendent reactive aldehyde groups formed from the reaction of glyoxal and a polymer wherein the polymer comprises at least one acrylamide repeating unit and at least one cationic repeating unit where the mole percentage of the acrylamide repeating units is at least 50 and the mole percentage of cationic repeating units is between 2 and 30, and where the equivalents of reactive aldehyde groups of the GPAM (moles of pendent reactive aldehyde groups per grams of GPAM polymer) divided by the equivalents of residual glyoxal (moles of unreacted glyoxal per grams of GPAM polymer) in the composition is greater than about 1.2, preferably greater than about 1.5, preferably greater than about 2 and where at least 5 mole % of the acrylamide repeating units of the polymer are converted to the pendent reactive aldehyde groups and where on ageing of the aqueous composition at about pH 3.2 and at 25° C. and at 10% solids for 30 days causes less than about a 200% increase of viscosity.

In various embodiments, the typical cationic monomers are diallyldimethylammonium chloride (DADMAC), 2-(acryloyloxyethyl)-trimethylammonium chloride, 2-(dimethylamino)ethyl acrylate, 3-acrylamidopropyl-trimethylammonium chloride, dimethylaminopropyl acrylamide, or combinations thereof.

In various embodiments, high functionality of the GPAM leads to high initial wet-strength properties imparted to paper where the GPAM resin is utilized. But, to obtain a higher level of functionality, although not as high as in the current disclosure, has in previous GPAM resins also meant having a higher level of residual glyoxal. For the current disclosure the final level of residual glyoxal in the GPAM resin is low compared to the achieved aldehyde functionality on the GPAM. For the aqueous composition of any one of the preceding claims wherein a mole ratio of equivalents of reactive aldehyde groups in said composition versus equivalents of glyoxal in said composition is greater than about 1.3, about 1.4, or about 1.5.

In various embodiments where there is a high level of pendent aldehyde functionality on the GPAM and lower residual levels of glyoxal this disclosure surprisingly obtains a higher level of ageing stability of the GPAM resin. Stability can be defined in various ways including the lack of an increase of viscosity on ageing or a retention of the level of reactive aldehyde functionality on the GPAM with ageing. Stability of the GPAM polymer in the aqueous GPAM resin composition depends on the pH and solids of the composition. For the aqueous composition of the current disclosure at 10 wt % solids and a pH of about 3.2 there will be less than a 200%, or less 150%, or less than a 100% or less than a 50% increase in viscosity and or less than about 40 mole %, about 30 mole %, or about 20 mole % loss of equivalents of reactive aldehyde groups on the GPAM after ageing at about 40° C. for about 30 days. The viscosity increase and or the stability of functionality can also be true for a aqueous GPAM resin composition of 12% or 14% weight percent solids.

In one embodiment for the aqueous composition of the current disclosure at a pH of about 3.2 there will be less than about 40 mole %, about 30 mole %, about 20 mole %, or about 10 mole % loss of equivalents of reactive aldehyde groups on the GPAM after ageing at about 25° C. for about 30 days.

The high pendent reactive aldehyde functionality of the GPAM for one embodiment of the current disclosure is arrived at by the reaction of glyoxal with the acrylamide groups of the starting cationic acrylamide polymer. The ratio of moles of glyoxal to moles of acrylamide groups on the starting polymer is critical. The ratio typically needs to be high enough to generate reactive aldehyde functionality on the GPAM but limit the number of crosslinks that form. For the aqueous composition of the current disclosure where during the reaction the glyoxal is added quickly to the starting polymer composition, the ratio of moles of glyoxal to moles of the acrylamide repeating unit is greater than about 0.7:1, greater than about 1:1, or greater than about 2:1.

The process of glyoxalation of the starting polymer can be further defined by a reaction window (RW) which takes into account the molecular weight of the polymer, the mole ratio of glyoxal to acrylamide groups, and the solids of the aqueous mixture of the glyoxal and polymer at the time of the reaction. Not every variation of the process can be described herein but will be appreciated by those of skill in the art. For the purposes of an exemplary definition of reaction window it is taken that the glyoxal is added to the starting cationic acrylamide polymer solution and that is added quickly such that all or almost all of the glyoxal is added as the glyoxalation reaction starts. Relative to the reaction composition and the reaction window the solids is defined as the weight percent concentration of the starting GPAM polymer in the entire aqueous composition at the start of the reaction, that is when all of the glyoxal has been added. A higher molecular weight of the starting polymer leads to a greater likelihood that the process will lead to gelation of the GPAM, that is too much crosslinking such that it forms a composition with a very high molecular structure. Likewise, as the solids at the time of the reaction is increased there is greater likelihood of intermolecular crosslinking being formed instead of intramolecular crosslinks. The intermolecular crosslinks lead to gelation when too many occur. Finally, the ratio of the glyoxal to acrylamide groups should be high enough so there is excess glyoxal which drives the reaction to give reactive aldehyde functionality rather than crosslinks. The molecular weight of the starting polymer can be expressed by the reduces specific viscosity (RSV). For the current disclosure where the glyoxal is added quickly to the starting polymer mixture, the RW is defined as the RSV times the RSV times cationic acrylamide polymer solids of the reaction as a weight % at the time the glyoxalation reaction begins divided by the ratio of moles of glyoxal to moles of acrylamide groups. The acceptable RW is less than about 0.14, about 0.12, or about 0.10. As noted above, the solids for the purpose of defining the RW is defined as the weight percentage of the starting cationic acrylamide polymer to the total aqueous composition of the reaction which comprises the polymer, the glyoxal, and the water of the reaction mixture.

The compositions and process in one embodiment of the current disclosure have an unexpected advantage which is more than avoiding gelation during the glyoxalation reaction. The composition and process obtain the desirable property that the viscosity of the mixture during the glyoxalation process does not increase quickly. If viscosity increases quickly during the reaction, even at the later times of the reaction, then there can be difficulty controlling the viscosity and molecular weight of the final GPAM. A rapid increase of viscosity during the glyoxalation means that special care should be taken, i.e., monitoring should occur, during large scale manufacturing to avoid forming a high viscosity or gelled mixture in a reaction vessel. Within the RW of the current disclosure the GPAM reaction mixture will not only not gel but will have a minimum increase of viscosity such that it doesn't need to be monitored closely as in previous GPAM resin preparations. The reaction time can vary even by hours without there being a large change in viscosity, molecular weight, or even final performance of the GPAM resin for producing initial WS in paper. In one aspect, a ratio of the RSV of the final GPAM resin compared to the RSV of the starting polymer is less than 3, or less than 2, or less than 1.5, or less than 1.2.

A different, alternate process can be followed for the reaction of the glyoxal with the acrylamide groups of the cationic acrylamide polymer. Rather than addition of the glyoxal to the polymer or a rapid mixture of the two materials, the polymer can be slowly added to the glyoxal solution. After the addition of the polymer slowly to the glyoxal the reaction may be continued. This process variation obtains on average a higher ratio of moles of glyoxal to moles of acrylamide groups that are available to react with the glyoxal. The amount, rate of addition, and nature of the polymer added to the glyoxal can be such that at least 50% of the level of final reactive aldehyde groups that will be present on the GPAM will be present on the GPAM as it is being formed before all of the polymer is added to the glyoxal. The amount, rate of addition, and nature of the polymer added to the glyoxal can be such that at least 65% or at least 80% of the final reactive aldehyde groups on the polymer are formed before all of the polymer is added to the glyoxal. Optionally, the formed GPAM pH is lowered to about 3.2 and optionally some of the excess glyoxal is removed.

In another embodiment, the GPAM compositions of the current disclosure are prepared by an alternate process. In the GPAM processes described herein the glyoxal is added to the polymer or the glyoxal and polymer are added quickly together and the glyoxalation reaction occurs. The current alternate process is to add the polymer slowly to a glyoxal solution. The result is surprisingly an increased size of the reaction window while obtaining the same benefits of the compositions and process elsewhere described as part of this disclosure. In the GPAM resins of the alternate process use of an excess mole % of glyoxal to moles of acrylamide groups on the cationic acrylamide polymer during the overall glyoxalation reaction leads to a GPAM of high reactivity—that is at least 20% of the acrylamide groups are converted to form reactive aldehyde functionality, there is excellent storage stability, and there is high efficiency at imparting wet strength to paper. In addition, in the final GPAM resin the equivalents of functional aldehyde groups on the GPAM divided by the equivalents of residual glyoxal in GPAM resin will be greater than 1.2 making the GPAM resin safer to use in the making of paper. In the new process where the polymer is added to the glyoxal, what one might call a reverse glyoxalation process, less viscosity build occurs during the glyoxalation process compared to adding the glyoxal quickly to the polymer. The effect is to enlarge the reaction window allowing for use of a starting cationic acrylamide polymer with a higher RSV or allowing for higher overall or final polymer solids during the glyoxalation reaction or allowing for a lower ratio of moles of glyoxal to moles of acrylamide groups on the cationic acrylamide polymer. For example, an alternate (inverse) process is adding prepolymer to glyoxal as compared to a first process wherein glyoxal is added to the prepolymer.

This disclosure also described preparation of paper where temporary wet strength (WS) is utilized. For example, a process for forming paper may include
1. providing an aqueous suspension of cellulosic fibers;
2. adding an aqueous composition to the suspension, wherein the aqueous composition comprises the description of the GPAM resin described herein this document
3. forming the cellulosic fibers into a sheet; and
4. drying the sheet to produce a paper having an initial wet tensile strength that is at least about 10%, about 15%, about 20%, about 25%, or about 30%, greater than a comparative paper when only about 15 mole % of the at least one acrylamide repeating units is converted to reactive aldehyde groups.

A paper formed by the above process can be formed with addition level of about 0.3% of the GPAM resin on a dry weight basis and have an initial wet strength about 10%, about 15%, or about 20% higher than a comparative paper formed with an equivalent composition made with a GPAM wherein the extent of reaction of the acrylamide groups of the starting polymer to form reactive aldehyde functionality of the GPAM is less than about 15%.

One embodiment of the present disclosure comprises a water-based mixture or solution of a cationic polymeric resin with pendent reactive aldehyde functionality, a glyoxalated polyacrylamide (GPAM) which is formed from the reaction of a polymer, of acrylamide and cationic monomer repeat units, with glyoxal to form reactive pendent aldehyde functionality on the polymer (also referred to as the reactive aldehyde groups of the polymer). The reactive cationic resin composition, known as a glyoxalated polyacrylamide (GPAM) resin, when prepared can have at least 40 or 50% or 55% of the amide groups of the starting cationic polyacrylamide that are reacted with the glyoxal. It is not simply the level of amide groups that react that is important, but rather how many form pendent reactive aldehyde functionality in the final GPAM. The current disclosure is distinguished further in that 40 to 50% to 60% of the amide groups that react form reactive aldehyde functionality. In one embodiment greater than 20% or greater than 25% or greater than 30% on a molar basis of the starting amide groups of the cationic anionic acrylamide polymer are present as aldehyde functionality in the final GPAM. Some of the pendent polymer aldehyde groups formed from the glyoxal reaction with the polymer can react with other polymer chains to form crosslinks and some can react intramolecularly with the same polymer chain they are located on. Not all of the glyoxal used in the glyoxalation reaction reacts with polymer and some remains as glyoxal in the GPAM resin. Some of the glyoxal may then be removed after the glyoxalation reaction is completed. The amount of glyoxal in the final mixture of GPAM resin and water will be referred to as the residual glyoxal. For the current disclosure there is a high degree of aldehyde reactivity on the final GPAM polymer and a relatively lower level of residual glyoxal compared to the level of GPAM polymer in the GPAM resin composition, thus making the GPAM resin highly efficient at forming wet strength in paper and safer to use compared to prior GPAM resins. The lower level of residual glyoxal is advantageous. In addition, the final GPAM resin can have excellent ageing stability. In addition, the final GPAM resin can impart a high degree of initial wet-strength performance to paper and in some cases better wet-strength decay than previous GPAM resins with lower levels of aldehyde functionality on the GPAM.

In one embodiment, the GPAM resins of the current disclosure have a higher level of reactive aldehyde groups than previous GPAM resins. Therefore, they can provide improved initial wet strength to paper that contains them compared to GPAM resins with lower levels of aldehyde functionality. In one embodiment, the GPAM resins have improved safety and storage stability and easier manufacturing of the GPAM in terms of the glyoxalation process.

The current GPAM resins, on a basis of % by weight addition to paper under equal conditions can generate 10%, or 15%, or 20%, or 25%, or more than 30% more initial wet strength compared to a current commercial GPAM resin known as Hercobond™ 1194 resin from Solenis LLC which had 1.76 meq/g reactive aldehyde and where only about 16% of the acrylamide groups were converted into reactive aldehyde functionality. Not to be bound by theory, it is believed that increase of initial paper wet-strength (WS) results from the higher level of reactive aldehyde functionality. The percentage of decay of wet strength over time as a paper stays wet was also found unexpectedly to be greater for the current GPAM resins than for the commercial 1194 product. Whereas typical GPAM resins, including the commercial control, give about 55% decay in wet strength over time in a specified test described below, the current GPAM resins provide about 5% or 10% more decay, or about 60% decay. Both a higher strength and a greater level of decay are desirable properties. Uniquely, the current disclosure combines improved performance with improved safety, improved storage stability, and ease of manufacturing concerning the glyoxalation process.

In the paper making process, there are generally three steps. The first is forming an aqueous suspension of cellulosic fibers. The second is addition of additives such as the current disclosure to the suspension. The third is to form and dry the sheet. For tissue and towel grades there is a fourth step of creping or forming a structure of the paper to provide properties such as softness. These steps can be modified by one of skill in the art.

The reactive cationic resins of the present disclosure, in one embodiment, can be added to the papermaking process at any point in the process where strength resins are presently added, and typically the resins are added to the paper as aqueous composition. The GPAM resins of the disclosure, in one embodiment, can be added at any time before, during or after the paper is formed. For example, the resin can be added before or after the refining of the pulp, at the suction side of the machine chest, at the fan pump or head box, or by spraying or a foam application onto the wet web. The resin can also be added to preformed paper by tub sizing or spraying via application onto the dried paper sheets. In most commercial papermaking, it is typical to add the resin at the suction side of the machine chest or at the fan pump or head box in the form of an aqueous composition. Various amounts of resin can be used. The actual amount of resin used in the paper can be easily determined by one skilled in the art.

Some GPAM resins of low reactive aldehyde functionality have relatively low levels of residual glyoxal used in making the GPAM resin. In the current disclosure, reactive aldehyde functionality when referring to a GPAM or GPAM resin will be referred to as reactivity or functionality. Prior GPAM resins with even slightly higher levels of reactive aldehyde functionality than previous GPAM resins have had higher levels of residual glyoxal as a % of the GPAM polymer. The level of functionality of the current GPAM is greater than such previous GPAM resins and because of higher functionality the current GPAM resins are more efficient at generating, that is imparting, higher initial wet strength in the final treated paper. Yet at the same time in the GPAM of the current disclosure the level of residual glyoxal is less for a given level of GPAM functionality and for the level of initial wet strength per amount GPAM in the paper, that is its efficiency. This can be traced to a ratio of the amount of reactive aldehyde groups compared to the level of glyoxal in the final GPAM. The levels can be expressed in terms of equivalents on the basis of the GPAM polymer repeat units, i.e., millimoles of a reactive aldehyde functionality or moles of glyoxal for a given weight of the GPAM polymer. The ratio of the equivalents of reactive aldehyde groups to the equivalents of residual glyoxal defines a safety factor (SF). For the present disclosure, in one embodiment, the equivalents of the reactive aldehyde groups divided by the equivalents of the residual glyoxal in the composition tends to be greater than greater than 1.2, or greater than 1.3, or greater than 1.4 or greater than 1.5.

Water soluble aldehydes, such as glyoxal, in water solutions exist in various forms such as hydrated monomeric species or as hydrated dimers or oligomers. The various forms may be counted as if existing as a basic aldehyde structure. An aldehyde group or compound molarity, including that of residual aldehyde and aldehyde based functionality on a polymer, is based on the aldehyde being in its simplest form, that is not hydrated or chain extended or in any other form. The meq of polymer aldehyde functionality can be measured by NMR methods. The level of glyoxal, counting all of its various forms, can be measured by a titration method.

In addition, in embodiments of this disclosure the glyoxal level of the GPAM resin, that is the GPAM polymer and the glyoxal, can be less than 10% by weight.

GPAM resins of relatively high solids content, such as greater than about 8 or 10 weight % in water, typically suffer from poor shelf life. Over time and after being made they tend to show an increase of viscosity and a loss of pendent reactive aldehyde functionality. They tend to increase in viscosity even to the point of gelation. A shelf life of prior aqueous GPAM resins compositions of relatively high solids, such as 10%, can be less than 30 days at 30° C. before they are too thick to easily utilize on a paper machine. Another aspect of the present disclosure, in one embodiment, provides improved storage stability combined with the high reactivity and or high efficiency. Shelf life is a description of the stability of a GPAM resin over time and the stability or lack of can be described and measured by changing in the viscosity of the GPAM resin or changes in the aldehyde functionality of the GPAM or by changes in the uniformity of the GPAM resin or by changes in the efficiency of the GPAM resin to impart initial wet strength to paper. The aqueous GPAM compositions viscosity at a weight % solids greater than 8%, or greater than 10%, may be such that the viscosity does not increase more than 200% or more than 100% or more than 50% or more than 30% or more than 20% or more than 10% when aged in a sealed container for longer than one month or longer than 2 months at 40° C., the stability being determined at an optimum pH. Not to be bound by theory, but it is believed that the cause is the tendency for the reactive aldehydes to react with free groups, such as amide groups, to give further crosslinking. In the current resins the modification of the prepolymer groups reactive to aldehyde is taken to completion or near completion, that is the rate of reaction and extent of reaction under normal conditions where reaction can occur slows greatly.

The GPAM resins of the current disclosure show very little or no increase of viscosity when aged and they lose reactivity at a very slow rate. Those skilled in the art understand how changing active solids, that is the weight % of the GPAM polymer, and temperature and pH of the aqueous GPAM resin composition tend to affect stability. Stability of the current inventive aqueous GPAM resin compositions is greatly increased compared to other relatively high solids aqueous GPAM resin compositions under normal conditions of storage for such compositions. It is even more surprising for the current aqueous GPAM compositions that the stability occurs in the absence of a high level of residual, that is unreacted, glyoxal in the aqueous composition. Again, not being bound by theory, but the relatively long storage stability of the current GPAM disclosure, in one embodiment, is unexpected because it is contrary to previously held findings that a GPAM resin with increased reactivity and/or a low level of the residual starting glyoxal in the final mixture/solution tend to lead to a short shelf life. Although higher levels of reactivity have been said to cause more reactions in the final product on ageing leading to viscosity increases, a low level of the glyoxal, such as below 10% on a weight % basis of the GPAM polymer, would be expected to lead to a reversal of glyoxal reactions that occurred during the formulation of the GPAM resin. For the current disclosure this reversal did not occur as quickly as expected during ageing tests. The reversal tends to be slow to occur at lower pH values such as between 2 and 4 or 2.5 and 3.5 or between 3 and 3.5 or between 2.8 and 3.2. The reversal and stability can be pH dependent and one advantage of the current disclosure is observed when comparing GPAM resins of equal pH. Stability can be such that the level of GPAM aldehyde functionality decreases less than 50% or less than 40% or less than 30% or less than 20% or less than 10% or less than 5% when aged at 40° C. for greater than 1 month or greater than 2 months. The stability can be such that at least 98% of the GPAM resin remains physically uniform when aged at 40° C. for greater than 1 month or greater than 2 months. The stability can be such that the efficiency (wet strength per % of GPAM resin retained in the paper) of the GPAM resin for imparting initial wet strength to paper remains at least 50% of its original value or at least 70% of its original value when aged at 40° C. for great than 1 month or greater than 2 months.

Reactions related to loss of stability are slowed by a reduction of the GPAM resin composition pH. Some instability and reversal of the aldehyde reaction may occur at a higher pH, such as above pH 7, when there is a low level of free glyoxal, but the relative amount that occurs is less than in past GPAM resins of equal solids. In one embodiment of the current disclosure a reduction of the pH is eliminated and the stability of the GPAM resin composition is improved to more than twice the length of stability of previous GPAM resins of at least 8% solids at an equal pH.

The GPAM compositions of the current disclosure start with preparation of a polymer which can be reactive with a glyoxal to form a polymer with reactive aldehyde functionality. The polymer to be reacted has groups that can be reacted with the glyoxal. These may be any known in the art. For example, a comonomer which is dialdehyde-reactive can be used in the formation of the reactive cationic resins of the disclosure. In another embodiment, any comonomer which is dialdehyde-reactive which is capable of reacting through radical chain polymerization with a cationic comonomer to form a dialdehyde-reactive copolymer can be used. In one embodiment, the comonomer which is dialdehyde-reactive is typically acrylamide.

The polymers also include ionic repeat units. The typical ionic charge is cationic. A cationic comonomer of use in the formation of the reactive cationic resins of the disclosure, in one embodiment, may be any cationic monomer which is capable of reacting through radical chain polymerization with the comonomer which is dialdehyde-reactive to form a dialdehyde-reactive copolymer. Cationic monomers include tertiary and quaternary diallyl amino derivatives, or tertiary and quaternary amino derivatives of acrylic acid or (meth) acrylic acid or acrylamide or (meth)acrylamide, vinylpyridines and quaternary vinylpyridines, or para-styrene derivatives containing tertiary or quaternary amino derivatives.

The cationic comonomers may be a member chosen from diallyldimethylammonium chloride (DADMAC), [2-(acrylamido)ethyl]trimethylammonium chloride, [2-(methacrylamido)ethyl]trimethylammonium chloride, [3-(acrylamido)propyl]trimethylammonium chloride, [3-(methacrylamido)propyl]trimethylammonium chloride, N-methyl-2-vinylpyridinium N-methyl-4-vinylpyridinium, p-vinylphenyltrimethylammonium chloride, p-vinylbenzyltrimethylammonium chloride, [2-(acryloyloxy)ethyl]trimethylammonium chloride, [2-(methacryloyloxy)ethyl]trimethylammonium chloride, [3-(acryloyloxy)propyl]trimethylammonium chloride, [3-(methacryloyloxy)propyl]trimethylammonium chloride, and combinations thereof.

Mixtures of cationic comonomers can be used for the same purpose. It is typical that the cationic comonomers are not reactive towards dialdehyde under basic conditions, e.g. greater than pH 7.

A typical cationic comonomer is diallyldimethylammonium chloride (DADMAC). It is understood that mixtures of cationic comonomers can be used to the same purpose. It is typical that the cationic comonomers are not reactive towards glyoxal under basic conditions, i.e., greater than pH 7. The typical level of cationic monomer on a molar basis is at least 2% of the starting polymer, or at least 5%, or at least 10%, or at least 15%.

The acrylamide is typically used in an amount of at least between 50 to 95 or 60 to 90% or 65 to 90% on a mole basis of the prepolymer used to form the GPAM resin.

The reactive aldehyde functional repeat unit is derived from the reaction of glyoxal with acrylamide. Glyoxal is the typical aldehyde compound. Glyoxal can react predominantly to form pendent reactive aldehyde functionality by reacting only once as opposed to reacting twice. When the glyoxal reacts twice it can be between polymer chains which is intermolecular crosslinking or intramolecular where the two reactions are within the same polymer chain. The balance of mono to di reaction can be from greater than 1 to 1, or greater than 1.5 to 1, or greater than 2 to 1, or greater than 2.5 to 1, or greater than 3 to 1. A higher ratio leads to more GPAM reactive aldehyde functionality and less GPAM crosslinking. Crosslinking causes viscosity build during the glyoxalation reaction. In addition, the ratio of intramolecular to intermolecular reactions of the di reactions is greater than 1:2, greater than 1:1, greater than 2:1, or greater than 3:1.

In the use of GPAM resins in a paper making process other chemicals may be added. For example, a small amount of a cationic polymer can be utilized to neutralize anionic materials in the pulp. Moreover, a debonding agent can be added to soften the paper. Cellulose derivatives such as carboxymethyl cellulose or various types of starches or synthetic polymers such as polyacrylamide copolymers or permanent wet-strength resins such a polyamidoamine-epichlorohydrin resins can also be added. Other additives such as common in paper making such as mineral fillers or aluminum sulfate may be added. Compounds to improve paper softness may be added. Such materials used in the paper of paper grades containing GPAM resins are well known and described in general paper making literature and articles. They may affect performance of GPAM resins by changing retention or pH. However, the current disclosure provides performance advantages under similar conditions compared to other GPAM resins In various embodiments, the uniqueness of the GPAM resins of the current disclosure are made possible by new processes. The processes therefore are another aspect of the current disclosure. In various embodiments, the composition of the current disclosure is most conveniently made in three steps. In the first step, the prepolymer composition that is to be reacted with the glyoxal is prepared. In the second step the resulting polymer is reacted with glyoxal to produce the reactive resin and the pH of the reactive resin is adjusted. The third step is removal some of the excess (residual) glyoxal.

Step 1: Prepolymer Polymerization

There are multiple methods to prepare the prepolymer of the current disclosure. One method is a free radical polymerization in water. One option for the free radical polymerization is to use a redox initiating system such as a combination of sodium metabisulfite and sodium persulfate. Those skilled in the art can obtain the relatively low and controlled molecular weight for the final polymer that is required for the next step of the process. The levels of residual monomers should be low. The molecular weight may be monitored by reduced specific viscosity (RSV) or by size exclusion chromatography (SEC).

Many other combinations of redox initiating systems can also be used in initiating polymerization of the comonomers to form copolymers used to form the resins of the present disclosure including other persulfate salts such as potassium persulfate or ammonium persulfate or other components such as potassium bromate. Some of these redox initiating systems may be used in combination with a chain transfer agent, such as a sodium hypophosphite or sodium formate or isopropanol or a mercapto compound or sodium metabisulfite. Any initiator and chain transfer compound known in the art can be used.

Polymerization is typically carried out in an aqueous solution at a temperature of at least about 25° C., or at least about 45° C. typically at a temperature between about 50 and about 90° C. It is sometimes advantageous to raise the temperature after the addition of all comonomers can have been completed so as to reduce the level of residual monomers in the product. The pH during the reaction can be dependent on the initiator used and may be adjusted with acids or bases or with a buffer.

Comonomers maybe added all at once or added over any length of time. If one monomer is less reactive than another, then it can be advantageous to add part or all of the slower reacting monomer at the start of the polymerization, followed by a slow continuous or multiple batch wise additions of more reactive monomer. Adjusting feed rates can lead to more uniformity of the compositions of polymer chains. Likewise, initiators may be added at once or added over any length of time. To reduce the amount of residual monomer in the copolymer, is often advantageous to continue adding the initiator system for some time after all monomers have been added, or to introduce batch wise additional amounts of initiator. Controlling polymer compositional and molecular weight uniformity by controlling addition times is appreciated by the skilled person.

Any method known in the art can be used to control molecular weight of the final prepolymer by changing polymerization conditions such as the concentration of monomers, the concentration of initiators, and the concentration of chain transfer agents. Likewise, the level of oxygen in the reaction mixture can be varied, but commonly oxygen is purged from the reaction mixture. Molecular weight may also be varied by adding monomers with multiple reactive vinyl groups, or by post treatment of the polymer formed, as known in the art. In various embodiments, the amount of cationic comonomer needed in the polymer of the present disclosure, in one embodiment, is at least 2 mole % or at least 5 mole % or at least 10 mole % or at least 15 mole % and less than 35 mole % or less than 30 mole %.

Aldehyde Functionalization:

To generate the reactive ionic resins of the present disclosure, the prepolymer can be reacted with glyoxal. The reaction of acrylamide containing polymer with an glyoxal is typically carried under mild basic to neutral conditions, typically between pH 7.0-11 or pH 7.0-10.5 or pH 7.5 and 9.8 or pH 8.0 and 10.5. The glyoxal is added quickly to the prepolymer to minimize crosslinking. Alternatively, in another aspect of the current disclosure the prepolymer solution can be added to the glyoxal. This later method minimizes the crosslinking and viscosity build of the final GPAM resin by maintaining for a longer time a large excess of aldehyde groups for amide groups. It is described in more detail below. The aldehyde reaction is typically carried out between about 15 and about 40° C. or between 18 and 30° C. or between 19 and 23° C.

The reaction solids, that is the solids of the cationic acrylamide polymer at the start of the reaction, the molecular weight of the prepolymer, and the ratio of glyoxal to acrylamide groups on the starting cationic acrylamide polymer, also known as a prepolymer, are important. In one embodiment, the goal of the present disclosure is a process that generates a high level of reactive aldehyde functionality on the final GPAM polymer without creation of too many intermolecular crosslinks or excess build of the molecular weight and thus viscosity of the final aqueous GPAM resin composition. Intermolecular crosslinks tend to cause the viscosity to rise excessively or quickly such that a gel might form during the reaction or in the final polymer where the higher molecular weight can reduce final product stability (shelf life). Also limiting the intermolecular crosslinks reduces the viscosity build during the reaction such that the reaction need not be carefully monitored during the reaction. At the same time, some intermolecular crosslinks may be desired to build a higher molecular weight of the final GPAM resin. A balance is obtained, unique to this disclosure, in one embodiment, between a high reactivity of the final polymer, the weight percent of GPAM polymer in the final aqueous GPAM composition, the level of residual, that is unreacted glyoxal in that composition, and the ageing stability of that composition. A high reactivity of the final polymer can lead to higher wet strengths of the paper made with the final compositions of the disclosure, and in one embodiment the level of wet-strength decay remains high at the same time the greater wet strength is obtained. The balance unique to this disclosure, in one embodiment, starts with a unique reaction conditions of prepolymer molecular weight, ratio of glyoxal to acrylamide groups from the prepolymer, and the GPAM polymer concentration at which the reaction is carried out. The balance of benefits of the final GPAM composition begins with the process where there are certain reaction conditions. In one embodiment the unique conditions can be defined as a reaction window (RW).

Without being bound by theory, previous GPAM resins have relied on an increase of polymer molecular weight to get higher strength values in the final paper, whereas the current disclosure relies on high levels of reactivity in many embodiments. The conditions of the reaction in the current disclosure contribute to the ability of the reaction to be run without excessive viscosity build or too rapid of a build of a viscosity build. Viscosity build during the aldehyde reaction comes from an increase of molecular weight which occurs from intermolecular crosslinking of polymer molecules. Some increase of molecular weight and some viscosity build are acceptable. What is acceptable is defined by the RW. Three factors tend to control the overall level of crosslinking, the intermolecular crosslinking and the final reactivity. The three factors include 1) the concentration of the starting cationic acrylamide polymer, that is its solids, 2) the molecular weight of the starting cationic acrylamide polymer, and 3) the ratio of moles of glyoxal used in the reaction to the moles of acrylamide groups of the cationic acrylamide polymer used in the reaction. The right combination of these factors to obtain the current disclosure and with a given process will define what can be called a RW.

In one embodiment the RW applies to a process where the glyoxal is added to a solution of the prepolymer. Another aspect of the current disclosure is to add the prepolymer solution slowly to a solution of the glyoxal. In the current disclosure with the relatively rapid addition of the glyoxal to the prepolymer, it is believed, but not to be bound by theory, that excess glyoxal can cap many of the amide groups quickly during the reaction process. Adding a low level of glyoxal or slowly adding a glyoxal so only a small amount is reacting at the start of the process is found to lead to development of higher viscosity and a greater tendency for formation of gelled polymer. Conversely, with a high level of amide groups reacted there is less viscosity build because there is a lower chance for crosslinking to occur by a second reaction of the glyoxal.

Without being bound by theory, the polymer concentration during a reaction, reaction solids, can have a strong influence on the level of interaction between polymer chains or in other words the overlapping of different polymer molecules in a solution. At very dilute solutions below what is called the critical solution concentration, there is no overlapping of polymer chains to the extent that they the overlapping influences the solution viscosity. At higher solids polymer chains overlap and entangle and there is a higher dependence of viscosity on concentration. The higher the concentration the more different polymer chains are next to each other. Therefore, running the reaction at a lower solids reduces the number of crosslinks between polymers (intermolecular crosslinks) while favoring the number of intramolecular reactions within a polymer chain and possibly favoring the a single reaction of a glyoxal with a polyacrylamide polymer to give pendent aldehyde functionalization of the polymer. It is desirable to prepare a GPAM resin with a higher final GPAM concentration. Doing so increases the capacity and utilization of a reaction vessel and to reduces the cost of shipping and storage of the GPAM resin. Therefore, it is desirable to run the glyoxalation reaction at a higher solids level, that is at a higher overall concentration of the starting cationic acrylamide polymer, the prepolymer. The concentration that can be used will depend on the prepolymer molecular weight and the ratio of glyoxal to acrylamide groups. As described above the solids that can be used may be defined by a RW. Running the reaction at a higher solids can also be utilized to give a desired increase of molecular weight to the final GPAM by how the solids influences intermolecular crosslinking. Finally, an ability to adjust the solids of the reaction can be used to influence the relative amount of inter versus intra molecular crosslinking. With polymer chains more isolated there can be a higher percentage of intra versus intermolecular reactions.

The second part is the molecular weight of the prepolymer used to form the GPAM resin. Carrying out the aldehyde reaction with a lower molecular weight prepolymer reduces the number of crosslinks between polymer molecules. How high or low the molecular weight of the prepolymer can be and still obtain the objectives such as high reactivity and initial wet strength, tends to be dependent on the other two factors of the RW.

The third part involves the ratio of the reactive aldehyde groups of the glyoxal to the functional groups on the prepolymer that react with aldehyde. In one embodiment, this may be considered the moles of glyoxal to the moles of acrylamide groups in the prepolymer. Adding excess glyoxal above a certain level leads to more single reactions of the glyoxal and thus more final reactive functionality. Surprisingly, there is an upper limit to the percentage of acrylamide groups of the prepolymer that tend to react with glyoxal to form reactive aldehyde functionality. The limit is less than 100% reaction of the acrylamide groups. The limit is about 45% with the limit of total acrylamide groups reacting being about 60 to 70% and the maximum ratio of groups that react with glyoxal where the glyoxal doesn't react a second time also being about 60 to 70% given the reaction is done at about 10% solids. Not to be bound by theory, but there may be stearic hinderance to the complete functionalization of a polymer by the glyoxal. This establishes the point at which the percent of reaction of the acrylamide groups tend to cease to increase or the rate at which they occur becomes negligible. The polymers of the current disclosure are brought to about the full extent of reaction with aldehyde groups that is possible. The ratio of aldehyde to functional groups that can be used is in excess of the number to reach the full extent of reaction. The ratio of glyoxal to acrylamide may be important to obtain the objectives of the GPAM resins tend to depend on the RW.

The balance of the three factors determines the RW. The three factors are: 1) The solids, that is the concentration, of the prepolymer at the time the reaction starts; 2) the prepolymer molecular weight; and 3) the ratio of moles of glyoxal to moles of acrylamide groups on the prepolymer. The goals again are to obtain a relatively high level of aldehyde functionality on the GPAM which leads to a relatively high level of initial wet strength imparted to paper where the GPAM is added, and little controlled increase of the viscosity of the glyoxalation reaction mixture; and a relatively high solids of the final aqueous GPAM resin composition, and good storage stability of the final aqueous GPAM resin composition. In one embodiment, where the glyoxal is added fairly rapidly, such as within 15 minutes or less at a steady rate, to the prepolymer, the RW can be defined as: the prepolymer concentration in the reaction composition as a weight percent at the start of the aldehyde reaction multiplied times the prepolymer molecular weight as described by RSV times again the RSV and divided by the ratio of moles of glyoxal added to the moles of acrylamide groups of the starting cationic acrylamide polymer. For the current example, a glyoxal molecule is assumed as the dialdehyde compound and a prepolymer comprising acrylamide and cationic monomer repeat units is assumed. The solids in the RW calculation is the weight % concentration (solids) of the prepolymer resin at the start of the reaction. The ratio of moles of glyoxal added to the reaction to moles of acrylamide groups on the prepolymer before the reaction starts is used. Finally, the molecular weight is the molecular weight of the prepolymer before the reaction occurs as expressed by the RSV (the method is described elsewhere in this application). It is assumed also that there is very little residual monomer in the prepolymer such that the RSV measurement is accurate.

In various embodiments, RW=(RSV×RSV×solids)/the ratio of glyoxal to acrylamide.

In one embodiment, the RW can be less than 0.14, or less than 0.12, or less than 0.1 For this value it is assumed there is use of an acrylamide based prepolymer and glyoxal and that the prepolymer is completely water soluble.

In one embodiment, the acrylamide polymer that may be glyoxalated, the prepolymer, can have a polydispersity less than 4 and a variation of composition that yields a glass transition temperature that can have temperature range from start to finish of less than 30° C. It is known that polymers may have a broad molecular weight and a broad range of compositions among the various polymer chains when made commercially. The polymer should be considered as a whole and not as individual polymer chains. Nevertheless, in various embodiments, at least 80% or at least 90% or at least 95% of the reaction process will fall within the RW range. It is impossible to define every aspect of the RW variables when reaction conditions change. Those skilled in the art of polymerization and glyoxalation reactions will understand the consequences of variables such as the pH or temperature during glyoxalation reaction or molecular weight distribution or composition uniformity of the starting acrylamide polymer.

For the present disclosure, in one embodiment, where the glyoxal is added to the prepolymer solution, the solids, that is the concentration of the prepolymer, as defined in the RW may be of from about 5 to 20%, or from 7 to 15%, or from 8 to 13 weight %. For the present disclosure, in one embodiment, the RSV of the prepolymer may be of from about 0.07 to 1.5 or about 0.07 to 1.0, or from 0.08 to 0.7, or from 0.09 to 0.4 dL/dry g. For the present disclosure, in one embodiment, the mole ratio of glyoxal to acrylamide groups may be of from about 0.65 to 3, or 0.7 to 2.5, or from 0.8 to 2.

An advantageous embodiment includes enough excess glyoxal to reach a high degree of glyoxalation and aldehyde reactivity without gelation occurring. A further advantageous set of conditions includes when the level of excess glyoxal and the molecular weight of the GPAM prepolymer are such that the reaction reaches a limit to the amount of reaction of aldehyde with acrylamide groups and does not gel even when the reaction is allowed to proceed for an excess length of time. In some embodiments, the reaction tend to not gel even when not monitored for viscosity changes. This represents a large advantage in the manufacturing process by eliminating the need for viscosity monitoring and eliminating the possibly of gelation occurring in a reactor. It is also advantageous that during the reaction of the glyoxal with the prepolymer that less build in viscosity occurs than with a traditional formation of the GPAM resin. The reaction time can vary even by hours without there being a large change in viscosity, molecular weight, or even final performance of the GPAM resin for producing initial WS in paper. In one aspect, a ratio of the RSV of the final GPAM resin compared to the RSV of the starting polymer is less than 3, or less than 2, or less than 1.5, or less than 1.2.

It is also advantageous to run the glyoxalation reaction at a higher concentration, that is solids, of the prepolymer to optimize the efficient use of a reactor vessel and to obtain a final product of a higher GPAM concentration.

In another non-limiting embodiment, the GPAM resin remains water soluble at high levels of reaction with glyoxal such as greater than about 55% of the reactive polymer groups such as the acrylamide groups, and greater than about 60%, greater than about 65% and greater than about 70%.

In still other embodiments, a process includes removal of excess glyoxal at the end of the reaction or from the final product. Methods well known in the chemical manufacturing world can be used, such as membrane filtration. After removal of excess glyoxal and pH adjustment the solids of the final GPAM resin may be from about 2 to 25%, from about 5 to 20%, or from about 7 to 15%, or from about 8 to 13% weight percent. The residual level of glyoxal after removal of the excess glyoxal and pH adjustment can be less than about 15 weight % of the final GPAM polymer or less than about 13% of the final GPAM polymer or less than about 10% or less than about 5% or less than about 2% or less than about 1% of the final GPAM polymer, or the level of residual glyoxal after removal of the excess glyoxal and pH adjustment can be less than about 1.2% of the final GPAM resin composition, or less than about 1% or less than about 0.8% or less than about 0.5% or less than about 0.2% or less than about 0.1% of the final GPAM resin composition by weight.

In another aspect of the current disclosure the process of reacting the glyoxal with the prepolymer can be altered to give a different reaction window. In one set of embodiments, the glyoxal is added to the cationic acrylamide prepolymer. In another embodiment, e.g. by reversing the order of addition in a controlled manner, a different GPAM composition can be obtained. In particular, the prepolymer solution can be slowly added to a glyoxal solution or added to the glyoxal solution in stages to generate a different GPAM composition. The composition may be the same in terms of the added component and the residual level of glyoxal or it may be different. Without being bound by theory, what changes significantly is the distribution of glyoxalation and intermolecular crosslinks within the GPAM resin. In addition, the concentration of polymer or GPAM resin of a reaction can easily be adjusted during the process and the ratio can be changed during the process. The RW may be increased by diluting the reaction as it proceeds such that in the later stages when the intermolecular crosslinking in more likely to occur the concentration of prepolymer is low. Likewise, changing the ratio such that more glyoxal is added later in the reaction when there is more of a chance for crosslinking to occur can increase the RW. It is impossible to describe every variation of the addition times and rates of the glyoxalation reaction. For the purposes of this disclosure there are two categories. The first to which the extensive discussion above on RW applies, is the prior art where the glyoxal is added to the polymer solution. The second which is a different embodiment of the current disclosure is where the prepolymer is added to the glyoxal.

In this alternate process where prepolymer is slowly added to a glyoxal solution the initial ratio of glyoxal to acrylamide tends to start at a high value. For example, at a point where only one tenth of the prepolymer has been mixed with the glyoxal, the ratio of glyoxal to acrylamide can be, for example, ten times higher than if the glyoxal is added all at once to the prepolymer. Therefore, at the start of this modified process one can generate a high degree of glyoxalation and very little if any intermolecular or even intramolecular crosslinking. The amount, rate of addition, and nature of the polymer added to the glyoxal can be such that at least 50% of the level of final reactive aldehyde groups that will present on the final GPAM will be present on the forming GPAM before all of the polymer is added to the glyoxal. The amount, rate of addition, and nature of the polymer added to the glyoxal can be such that at least about 65% or at least about 80% of the final reactive aldehyde groups on the polymer are formed before all of the polymer is added to the glyoxal. In the alternate glyoxalation process described here the GPAM pH can be lowered to 3.2 and some of the excess glyoxal can be removed.

As more polymer is added the ratio can remain favorable to formation of reactive aldehyde groups until a significant portion of the glyoxal has been used up and the amount remaining is lower than what would be described above. The process can be continued to generate a portion of the GPAM that can have higher molecular weight because of crosslinking. Surprisingly this reverse process can lead to an overall lower viscosity build of the final GPAM resin than when the same prepolymer, glyoxal ratio, and solids as defined in the RW were used.

One alternative option is to change to a different prepolymer near the end of the reaction process when there is less glyoxal available for reaction. If the second prepolymer can have a low RSV then the range reaction window remains open to having less chance of gelation. The overall effect of various embodiments is to increase the ability to use a higher molecular weight polymer or run at a higher concentration of prepolymer or use a lower overall ratio of glyoxal to acrylamide.

In the GPAM resins of the alternate process use of an excess mole % of glyoxal to moles of acrylamide groups on the cationic acrylamide polymer during the overall glyoxalation reaction leads to a GPAM of high reactivity—that is at least 20% of the acrylamide groups are converted to form reactive aldehyde functionality, there is excellent storage stability, and there is high efficiency at imparting wet strength to paper. In addition, in the final GPAM resin the equivalents of functional aldehyde groups on the GPAM divided by the equivalents of residual glyoxal in GPAM resin will be greater than 1.2 making the GPAM resin safer to use in the making of paper. In the new process where the polymer is added to the glyoxal, what one might call a reverse glyoxalation process, less viscosity build occurs during the glyoxalation process compared to adding the glyoxal quickly to the polymer. The effect is to enlarge the reaction window allowing for use of a starting cationic acrylamide polymer with a higher RSV or allowing for higher overall or final polymer solids during the glyoxalation reaction or allowing for a lower ratio of moles of glyoxal to moles of acrylamide groups on the cationic acrylamide polymer.

Purification Process

In various embodiments, the method includes the step of removing excess glyoxal. In one embodiment, the method utilizes a membrane filter that removes lower molecular weight materials. The size of the opening of the membrane can be adjusted. For example, an Amicon ultrafiltration unit can be used with a membrane with about a 1000 g/mole cutoff. Membrane technology is described in detail in various references such as Dead End Membrane Filtration ENE 806 Laboratory Feasibility Studies in Environmental Engineering Spring 2006 Instructor: Dr. Syed A. Hashsham as reported by Ahsan Munir (PID: A37589962) which is expressly incorporated herein by reference in various non-limiting embodiments. Equipment is available from a variety of companies such as Amicon or Molecular/Por®. The membrane filtration technology described in U.S. Pat. Nos.

7,932,349 and 8,101,710, which are expressly incorporated herein by reference in their entireties in various non-limiting embodiments, can be used to remove excess residual glyoxal with a diafiltration process, for example. The filtration process can be run without excessive shear forces that would either tear apart a polymer chain or create excessive heat that would cause a loss of functionality. Alternatively, the glyoxal may be separated from the polymer by precipitating, washing, and dissolving the polymer in water. Other means of removing excess glyoxal known in the industry may be used.

Characterization Methods

The molecular weight of the prepolymer (the polymer to be functionalized with glyoxal) can be important relative to the RW. Herein, molecular weight may be expressed in terms of a material's reduced specific viscosity ("RSV") of 1% of a material in 1M aqueous NH4Cl at 25° C.

A GPAM or GPAM resin RSV can be determined using the following method. RSV of a 1% composition of the material in 1M aqueous NH4Cl is determined at 25° C. by means of a Ubbelohde viscometer and a Brinkmann Viscotimer. Flow times of the 1% material solution and the pure solvent are measured and the relative viscosity (Nrel) calculated. The reduced specific viscosity is calculated from the relative viscosity. This method is based on ASTM D446. The units of RSV are dL/dry g.

Various equipment is available for determining an RSV. For example one can use a Cannon MiniPV instrument or Ubbelohde Viscometer tubes available from Visco Systems, Yonkers, N.Y. or a Brinkmann Viscotimer C available from Brinkmann Instruments Inc., Cantiague Rd., Westbury, N.Y. 11590. For the current work, a constant temperature for samples was maintained with an oil bath at 25+/−0.1° C.

Solids of an aqueous GPAM resin composition, or of a prepolymer or of a glyoxalation reaction mixture can be measured by a variety of standard methods such as heating 0.1 g samples in aluminum pans in a 110° C. oven until there is a no significant weight loss or use of a moisture balance such as made by Mettler.

Viscosity during the glyoxalation reaction can be monitored to understand the progression of the reaction. The viscosity of the reaction mixture can be measured by a tube flow viscometer where the time for a specific volume of the GPAM resin composition to drain through a tube is measured. Typically, a tube size is selected that gives a drain time between two marks on the tube of about 5 seconds for flow of 5 ml of the composition at the start of the reaction. For the examples of the current disclosure the same tube viscometer was used for all of them. The viscosities are report as "flow viscosity" and the units reported are seconds. The final viscosity may increase about 10 times higher. The change of the viscosity from the start to finish and also the rate of change from one measurement to another is recorded. The reaction composition is tested as it is in the reaction vessel by drawing up a small portion of the mixture into the viscometer and immediately testing the viscosity. A rapid increase over a few minutes can indicate that the GPAM is crosslinking rapidly and may soon gel. With a slow steady increase of viscosity, the GPAM can be easily brought to a higher level of crosslinking. When little of no viscosity increase occurs the reaction can have minimal crosslinking forming and can be reacted for a specific time rather than by the monitoring of the viscosity.

To measure the level of free glyoxal in a glyoxalated polymer acrylamide sample, the reactive polymer mixture is reacted such that the glyoxal forms an adduct with a ultraviolet absorbance. The UV absorbance at a wavelength of 295 nm is then measured to give the glyoxal level. The reaction with the glyoxal occurs by diluting with water and reacted with Girard's reagent T (99%, CAS No. 123-46-6) at a pH of 2.9 and at 40° C. The reagent reacts with the alpha-dicarbonyl functional groups of the glyoxal. The glyoxal utilized in the reactions as obtained, typically a 40% solution, is utilized for obtaining a calibration of the method. A sodium formate buffer is prepared by mixing 4.3 ml formic acid with enough glyoxal free water to reach 1 liter total of liquid. With stirring the pH is adjusted with a 10M sodium hydroxide solution (also free of glyoxal) to a pH of 2.9. 1 ml of this mixture is mixed with 2 mg of Girard's reagent T. Fresh solution is prepared for testing. As a glyoxal control 0.1 mL glyoxal in a tared 50-mL volumetric flask and record the weight to the nearest 0.0001 g. The flask is filled to the mark with glyoxal free water. With calibration samples and glyoxalated polymer solutions the sample are tested by adding 0.1 ml (weight to nearest 0.0001 g) of sample to a vial, adding 25 ml of glyoxal free water and then taking 0.05 ml of this solution and mixing it with 10 ml of the Girard solution, and heating them at 40° C. for 30 minutes. The samples are then transferred to cuvettes and the UV absorbance is determined.

In various embodiments, the high level of aldehyde reactivity is a focus. The level of reactivity and the level of glyoxal that have been reacted twice can be measured by proton or C13 NMR analysis. The proton method determines the degree of acrylamide reacted with glyoxal to form a reactive aldehyde (a single reaction of the glyoxal) and also determines to total degree of acrylamide reaction with glyoxal (single and double reaction of glyoxal). The equipment utilized in the current work is an FT-NMR spectrometer, equipped with an inverse 5 mm probe, at an 1H operating frequency of 400 MHz, or higher field. The reagents can be dimethyl sulfoxide d6, 99.9% atom D and deuterium oxide, 99.9% atom D. Two processes are utilized for most accurate results.

1. A first process measures glyoxalated resins in as received state with addition of d6-DMSO. The method provides the levels of reacted acrylamide groups based on acrylamide residues in the polymer. The total reaction of acrylamide groups is based on the amido proton and it is essential that the pH of the sample be in the acidic regime, that is with a pH of about 3.0 to 3.5. When the concentration of byproducts is high, the intensity of byproduct signals tend to potentially overlap and impact the integration of NMR signals. Therefore, efforts to remove byproducts, like using a diafiltration membrane filtration process, can be used.

2. A second process utilizes a mixture of the reacted polymer with D20 and it provides better accuracy for the single reaction of glyoxal with acrylamide. The total amount of acrylamide reacted with glyoxal comes from an integration of all amido hydroxy protons. It is typically necessary to remove glyoxal byproducts, via a diafiltration membrane filtration process, to obtain a reasonably accurate integral. Results of each process can be combined. In addition, an internal standard may be added.

Integrals are obtained between 0.4 to 2.8 ppm corresponds to measure all polymer backbone protons; between 2.8 to 3.9 ppm corresponds to give the level of DADMAC protons (when DADMAC is utilized in the polymer); between 4.77 to 4.97 ppm to give the level of the dihydroxy methine protons from a single reaction of glyoxal with acrylamide; between 4.95 to 5.9 ppm to give a measure of all amido hydroxy protons which come from both single and double reaction of glyoxal with acrylamide groups; and between 7.75 to 9.25 ppm to provide the level of all amido protons.

The stability of the final GPAM resin can be monitored by ageing closed samples in an oven at 32° or 40° or 50° C. and then measuring the level of reactive aldehyde functionality and the sample viscosity over time.

In various additional non-limiting embodiments, the current process includes a step wherein glyoxal is added to the polymer solution at a rate that it is completely added prior to 5% of the final glyoxal-acrylamide reactions occur. In other embodiments, glyoxal is added to the polymer solution. In further embodiments, optionally, excess glyoxal is removed, e.g. by a form of membrane separation. In still other embodiments, the glyoxal level referenced is the glyoxal level based on the levels where no reaction has occurred.

In still other embodiments, the extent of the reaction of glyoxal with acrylamide groups of the polymer is such that at least 40% of the acrylamide groups are converted to reactive aldehyde functionality; the at least one cationic repeating unit is formed from one or more of the following: diallyldimethylammonium chloride (DADMAC), 2-(acryloyloxyethyl)-trimethylammonium chloride, 2-(dimethylamino)ethyl acrylate, 3-acrylamidopropyl-trimethylammonium chloride, dimethylaminopropyl acrylamide, or combinations thereof; greater than about 60 mole % of the acrylamide repeating units of the polymer react with glyoxal; a mole ratio of equivalents of reactive aldehyde groups in the composition versus equivalents of glyoxal in the composition is greater than about 1.5; the composition comprises about 10 wt % of the cationic resin at a pH of about 3.2 and exhibits less than about 10 mole % loss of equivalents of reactive aldehyde groups after ageing at about 40° C. for about 30 days; the composition comprises about 10 wt % of the cationic resin at a pH of about 3.2 and exhibits less than about 50% increase in viscosity after ageing at about 40° C. for about 30 days; the composition comprises about 10 wt % of the cationic resin at a pH of about 3.2 and exhibits less than about a 30% increase in free glyoxal equivalents after ageing at about 40° C. for about 30 days; and the composition has a solids content of at least about 14. In related embodiments, a ratio of moles of glyoxal to moles of the at least acrylamide repeating units of the starting cationic polymer is greater than about 2:1 based on a level wherein no reaction has occurred; greater than about 60 mole % of the acrylamide repeating units of the polymer react with glyoxal; and a mole ratio of equivalents of reactive aldehyde groups in the GPAM resin composition versus equivalents of glyoxal in the composition is greater than about 1.5.

Additional Embodiments

This disclosure also provides a process of forming paper, the process comprising the steps of:
providing an aqueous suspension of cellulosic fibers;
adding an aqueous composition to the suspension, wherein the aqueous composition comprises:
water; and
a cationic polymeric resin having at least one reactive aldehyde group and formed from the reaction of glyoxal and a polymer;
wherein the polymer comprises at least one acrylamide repeating unit and at least one cationic repeating unit;
wherein a number of reactive aldehyde equivalents divided by a number of equivalents of residual glyoxal based on the total weight of the polymer is greater than about 1.2, preferably greater than about 1.5, preferably greater than about 2;
wherein prior to reaction the polymer has greater than about 50 mole % acrylamide repeat units and from about 2 to about 30 mole;
wherein greater than about 5 mole % of the acrylamide repeating units of the polymer are converted to reactive aldehyde groups in the cationic polymer resin;
forming the cellulosic fibers into a sheet; and
drying the sheet to produce a paper having an initial wet tensile strength that is at least about 10%, about 15%, about 20%, about 25%, or about 30%, greater than a comparative paper when only about 15 mole % of the at least one acrylamide repeating units is converted to reactive aldehyde groups.

EXAMPLES

Example 1—Comparative Reference GPAM Resin

This example provides a process and results for a typical GPAM temporary wet-strength resin.

Step 1

A polymer was prepared of acrylamide (AM) and diallyldimethylammonium chloride (DADMAC). 4.9 g of a 65% by wt. solution of DADMAC in water (0.0197 moles) and 17.6 g of water were added to a flask and sparged with nitrogen. The solution was heated to and kept at 65° C., To the flask, which was kept under nitrogen atmosphere, was added 61.9 g of 43% by wt. AM solution in water (0.375 moles). The AM was added at a constant rate over 90 min. To the same flask was added 1.57 g of a 12.1% solution of sodium persulfate and 4.05 g of a 37% sodium meta bisulfite solution. The two later solutions were added at a constant rate over 100 min. The initiator solutions were sparged with nitrogen before addition. The reaction was stopped after 150 min. The final solids of the polymer composition was determined to be 35%. The RSV of the polymer was determined to be 0.118 dL/dry g.

Step 2

21.8 g of prepolymer solution was placed in a flask at 20° C. 70.4 g of water was added. 5.6 g of a 40% glyoxal solution in water was added. The initial mole ratio of glyoxal to AM groups before the glyoxalation reaction was 0.4 moles glyoxal to each mole of acrylamide groups on the polymer. The reaction pH was immediately adjusted to 8.7 with a 4% sodium hydroxide solution and maintained at pH 8.7 until viscosity increased in a tube flow viscosity with a 1.48 mm inner diameter to 22 seconds. The starting viscosity was about 6 seconds by the same means. Extending the reaction farther would lead to gelation of the polymer. The reaction was stopped by lowering the pH to 3.3 with a 20% sulfuric acid solution.

The final GPAM polymer was analyzed and found by NMR spectroscopy to have 15 mole % of the acrylamide groups modified to have reactive aldehyde functionality. This means that for the average number of polymer monomer units per polymer chain 15%*0.95 or 14% on average had reactive aldehyde functionality. So if on average the length of the polymer chains were 30 monomer units, on average about 4.2 of them would have aldehyde functionality. Where glyoxal reacts twice (both aldehyde groups) an intra or intermolecular crosslink is formed. In the current example, the level of AM groups that reacted to form a glyoxal based crosslink was 7.6 mole % of the initial number of AM groups or 7.2% of all of the monomer units. For the current samples, the reactivity in meq/g of the final polymer was 1.6. The calculation is as follows. The average molecular weight of a repeat unit on the polymer is 0.05*161.5+

0.95*71.08=75.6 g/mole. To this is added 0.14 moles of glyoxal reacted one time. For each 58 g/mole is added to the polymer average molecular weight per repeat unit. Also added to the polymer is 0.072/2 of twice reacted glyoxal which means 0.036*58 is also added to the average polymer repeat unit molecular weight. The final polymer average molecular weight per repeat unit is thus 85.8 g. There are therefore 0.14 reactive aldehyde groups per 85.8 g or 1.6 meq of reactive aldehyde groups.

For calculating meq/g it is assumed that the molecular weight of a repeat unit with aldehyde reactivity from a single reacted glyoxal is 133.6 g/mole with the glyoxal in the basic aldehyde form. Where the is a glyoxal reacted twice the 58 g of the glyoxal unit is added to two monomer units and the average weight of each monomer unit is thus 75.6+29 or 104.6. One can think of it this way, there would be 5 mole % DADMAC groups, 14 mole % acrylamide groups with aldehyde functionality, 7.2 mole % acrylamide groups with a glyoxal crosslink, and 95-14-7.2 or 73.8 mole % acrylamide groups. End groups have not been counted. 0.05*161.5+0.14*133.6+0.072*104.6+0.738*71.08=86.7 0.14 moles/86.7 g=0.0016 equivalents/gram or 1.6 meq.

For the current example a 10% solids sample of the aqueous GPAM resin composition at 22° C. had a Brookfield viscosity was approximately 10 cps.

The prepolymer concentration, that is solids as defined in the RW, at beginning of reaction was approximately 7.8 wt. %. The RSV was 0.118 dL/dry g.

The RW of this example was 0.118*0.118*7.8%/0.4=0.27.

The residual glyoxal level of the 10% solution was measured to be 0.9% by weight. The meq/g residual glyoxal was therefore 1.6. The SF was 1.6/1.6 or approximately 1.0

Example 2 GPAM within RW and Higher SF

Step 1 Polymerization
80:20 AM:DADMAC Polymer

An acrylamide polymer was prepared in the following manner. To a reaction vessel was added 93.3 g water and 31.8 g of a 65% solution of DADMAC in water and 15.6 g of a 50% acrylamide solution in water. The solution was sparged with nitrogen for 30 minutes. A nitrogen blanket was then maintained for the remainder of the reaction. The contents were heated to 45° C. When the temperature reached 45° C., 4 ml of a 5% sodium persulfate solution and 4 ml of a 10% sodium meta bisulfite solution were added. Then 69.4 g of each solution was added at a steady rate over 345 min. The initiator solutions were sparged with nitrogen before being used. When the vessel temperature reached 45° C. the addition of a monomer mixture was also started. A mixture of 97.4 g 50% acrylamide solution and 26.1 g 65% DADMAC solution was added over 195 min. From 210 to 240 min. after reaching 45° C., an additional 15.6 g of acrylamide solution was added. After the addition of the initiators and monomer mixture was started the temperature was allowed to increase to 55° C. and this temperature was maintained for 345 min. and then the temperature was increased to 70° C. for another 90 min. Several times at equal intervals during the reaction process, the pH was adjusted up to 6 with a sodium bicarbonate solution. The reaction was then cooled to room temperature and stored for later use. The reduced specific viscosity (RSV) of the polymer mixture, measured at 1% solids, was 0.114 dL/dry g.

Step 2 Glyoxalation

In a reaction flask, 250 g of a 10% aqueous solution of polymer was prepared the above polymer of this example was raised to a pH of 8.9 with a 10% NaOH solution. To the flask 48.7 g of a 40% aqueous glyoxal solution was added in a few seconds. The ratio of moles of glyoxal to acrylamide was 1.5. This means the ratio of aldehyde groups to acrylamide groups was 3.0. The mixture was stirred for 4.5 hours while pH was maintained at 8.9 with a 10% NaOH solution. The pH was then lowered to 3.2 with a 10% sulfuric acid solution. The RW was 0.073 (from a solids of 8.37, an RSV of 0.114, and a ratio of 1.5). During the reaction the flow viscosity increased from 4 to 6 over 6 hours. In other words, the reaction was stable, would not gel easily, and would not need to be monitored at a plant.

In the current example the reactivity of the GPAM resins was determined by proton NMR spectroscopy by the method described in this document and by the same method used in example 1. The moles of reacted AM groups to the total moles of AM are determined. Then based on the theoretical moles of AM in the polymer the moles of the reacted AM groups are determined.

For the aqueous GPAM resin composition, some of the excess glyoxal was removed by filtration through a 1000 g/mole membrane. The final weight % solids after filtering was 4.41% and the glyoxal level was 0.49 wt. %. The meq/g of glyoxal per total solids was 1000*(0.49/58)/4.41=1.91 The RSV of the reacted and filtered polymer was 0.143 dL/dry g.

For this example the safety coefficient as meq/g reactive aldehyde to meq/g residual glyoxal is 2.84/1.91=1.49 versus only 1.0 for example 1.

For this example the level of aldehyde functionality per polymer repeat unit (mole %) was 31.9% and the level of level of inter or intramolecular crosslinked acrylamide based repeat units was 18.7%. The ratio of reactive aldehyde AM groups to AM groups part of a crosslink was 31.9 to 18.7, or a ratio of 1.7. Despite a significant number of crosslinks there was very little flow viscosity increase during the glyoxalation reaction. This was an unexpected result. In addition, more acrylamide groups were reacted with glyoxal in example 2 than in example 1, but there was a less of an increase of flow viscosity. This was an unexpected result. The reaction window where a flow viscosity increase is relatively small was defined by this and other results.

A comparison was made of the wet-strength properties of the final GPAM resin versus those of example 1, and the results are listed in the following table. The paper samples were made on a Noble and Woods hand sheet former. The following procedures were used.

A pulp blend for paper making was prepared. It was a mixture of 70% hardwood and 30% soft wood at 3-4% consistency and refined to a Canadian Standard Freeness of 500. From the pulp and additives hand sheets of paper were made on a Noble and Wood former using standard hard water at a pH of 6. The wet-strength chemicals were added to the proportioner. The paper sheets made were 8" by 8" and weighed about 2.6 g when completely dried (about a 60 g/sq meter sheet, also known as a 40 pound sheet, that is 3000 square feet of paper weighs 40 pounds). The papers were aged a minimum of 1 week. The papers were cut into 0.75" strips and in the middle of the strip a ¼" hole was added to define the place of failure during a tensile test. The tensile strengths of the paper strips were determined for different lengths of time after being wetted with water. 6 paper samples were measured for each wetting time for each sample. The decay of wet strength is represented by the % of decay at two different lengths of time after being wet compared to the wet strength after 3 seconds of being wet. For the absorbent paper sheets of the current examples three seconds was chosen as the length of time wet to get an initial or starting wet-strength value. The 3 second measurement was automatically controlled by a computer during the strength testing. One can when stating or comparing wet-strength values of treated sheet subtract a baseline value which is define as the strength after being wet for 2 hours of an equivalent paper where no GPAM is added to the paper. The baseline for the paper samples of the examples of this disclosure was about 0.8 Newtons per half inch width.

For each example the level of GPAM added to the paper was 0.35% on a dry basis to the weight of the dry pulp. The results are set forth below.

| GPAM | Wet Strength vs time (Newtons/0.5 inch width) | | | % loss at |
|---|---|---|---|---|
| | 3 sec | 30 sec | 2 hour | 2 hours |
| Example 1 | 3.89 | 3.71 | 1.89 | 52 |
| Example 2 | 5.28 | 4.75 | 2.15 | 59 |

WS = wet strength in Newtons/half inch width

The results of example 2 was a GPAM with higher reactivity and more wet strength, while being more stable during manufacturing such that monitoring of viscosity is not needed during the reaction. The RW was 0.073 versus 0.27 for example 1.

The GPAM of example 2 was also safer to use in that less glyoxal to amount of reactivity remained and thus less glyoxal would be added to the paper during its use for a given final wet strength. In addition, the GPAM of example also surprisingly provided a greater level of wet-strength decay—59% versus 52% for example 1.

Example 3 80:20 AM:DADMAC Polymer

Step 1: Polymerization

An acrylamide polymer was prepared in a manner similar to example 2, except the initiator level was adjusted to give a final RSV of 0.143 dL/dry g and a measured weight average molecular weight of 27000.

Step 2 Glyoxalation

Glyoxalation of polymer from this example was carried out in a manner similar to the processes of examples 2 and 3. 250 g of a 10% aqueous solution of polymer was prepared. The pH was raised to 8.9 with a 10% NaOH solution. 65.5 g of a 40% aqueous glyoxal solution was added and 200 g water. The mixture was stirred for 6 hours while pH was maintained at 8.9 with a 15% NaOH solution. After 6 hours of reaction the pH was then lowered to 3.2 with a 10% sulfuric acid solution. The solids of the polymer at the start was 4.85%. The molar ratio of glyoxal to acrylamide groups was 2.0. The RW was 0.143*0.143*4.85/2.0=0.050.

During the glyoxalation reaction the flow viscosity increased from 5 to 6. Thus the reaction was extremely stable over time and thus consistent with the low RW. There would be no need in a production setting to monitor the increase of viscosity.

The final GPAM had 33.0% reactive aldehyde functionality on a molar basis as measured by NMR spectroscopy. The number of acrylamide reacted to glyoxal that reacted twice was 14.2%. Therefore, there was 2.97 meq/g of reactivity.

A comparison was made of the wet-strength properties of a commercial GPAM resin from Solenis called Hercobond™ 1194 resin (1194) with characteristics very similar to the GPAM resin of example 1. Papermaking and test conditions were very similar to the methods of Examples 1 and 2. The results are listed in the following table.

| GPAM | Wet Strength vs time | | | % loss at |
|---|---|---|---|---|
| | 3 sec | 30 sec | 2 hour | 2 hours |
| 1194 | 3.89 | 3.45 | 1.58 | 59 |
| Example 3 | 6.40 | 5.17 | 2.32 | 64 |

WS = wet strength in Newtons/half inch width

The GPAM of high reactivity of the current example had a low RW and was very stable during the glyoxalation process. It had a high level of aldehyde reactivity and provided improved wet strength and great wet-strength decay.

Example 4

Glyoxalation of Polymer from Example 2

250 g of a 10% aqueous solution of polymer was prepared from the polymer of example 2. The pH was raised to 8.9 with a 10% NaOH solution. 39.06 g of a 40% aqueous glyoxal solution was added and 117.17 g water. The ratio of glyoxal to acrylamide groups was 1.2. The mixture was stirred for 4.5 hours while pH was maintained at 8.9 with a 10% NaOH solution. During the 4.5 hours of reaction the flow viscosity rose from 4 to 10 at a slow rate. Over the last 47 minutes the flow viscosity remained at 10. There was no possibility of the reaction gelling quickly or of building excess viscosity. After 4.5 hours of reaction the pH was then lowered to 3.2 with a 10% sulfuric acid solution. The solids as defined in the RW, that is the concentration of prepolymer at the start of the reaction was 6.15%. The aqueous GPAM resin solids at the end of the glyoxalation reaction process, that is after pH adjustment, was 10.1% and the residual glyoxal level was 1.69%. Some of the excess glyoxal was then removed by filtration through a 1000 g/mole membrane and the solids was 4.03% and the glyoxal level was 0.46%. The RSV of the filtered GPAM mixture was 0.189 dL/dry g. The level of reactive aldehyde groups was 41.4 mole percent of acrylamide groups and thus 33.1% of all repeat units. The level of acrylamide groups converted to crosslinks (inter and intra molecular) was 21.9% and thus 17.5% of all repeat units. The milliequivalents of reactive groups was 2.59. The milliequivalents of glyoxal was 1.97.

The RW was 6.15*0.114*0.114/1.2=0.067.

The SF was 1.31.

A comparison was made of the wet-strength properties of the final GPAM resin versus those of the GPAM of example 1 and the testing was done at the same time as the GPAM of examples 1 and 2. The results are listed in the following table.

| GPAM | Wet Strength vs time | | | % loss at |
|---|---|---|---|---|
| | 3 sec | 30 sec | 2 hour | 2 hours |
| Example 1 | 3.89 | 3.71 | 1.89 | 52 |
| Example 4 | 5.22 | 4.57 | 2.10 | 60 |

WS = wet strength in Newtons/half inch width

The GPAM of example 3 had higher reactivity, gave more wet strength, decayed to a greater extent, was easier to glyoxalate, and was safer than the GPAM of example 1.

Example 5

The same prepolymer of example 3 was glyoxalated similar to in examples 3 and 4 using 3 different ratios of glyoxal to acrylamide. The ratios were 1.7, 1.5, and 1.25. The solids of the prepolymer at the start of the reactions were 5.82, 6.12, and 6.25 respectively. The following table lists the RW for each along with the flow viscosity build, meq/g of reactive aldehyde groups, the meq of glyoxal, and RSV samples where excess glyoxal was removed by membrane filtration.

| Ratio | Prepolymer solids at time of reaction | RW | flow viscosity change | Reactivity meq/g | Glyoxal meq/g | RSV (dL/dry g) | SF |
|---|---|---|---|---|---|---|---|
| 1.7 | 5.82 | 0.070 | 5 to 12 | 2.66 | 1.68 | 0.214 | 1.58 |
| 1.5 | 6.12 | 0.083 | 5 to 16 | 3.21 | 1.93 | 0.256 | 1.66 |
| 1.25 | 6.25 | 0.102 | 5 to 38 | 2.43 | 1.94 | 0.339 | 1.25 |

The RW increased as the ratio of glyoxal to acrylamide was decreased and as a result the flow viscosity build during the reaction increased.

As in the previous examples the wet strength of the paper made with each GPAM was tested. The results are in the following tables.

| GPAM | Wet Strength vs time | | | % loss at | Dry |
|---|---|---|---|---|---|
|  | 3 sec | 30 sec | 2 hour | 2 hours | Strength |
| 1194 | 3.01 | 2.60 | 1.22 | 60 | 28.9 |
| Example 5 1.7:1 | 7.41 | 6.22 | 2.87 | 61 | 36.0 |
| Example 5 1.5:1 | 7.23 | 6.19 | 2.84 | 61 | 36.3 |

WS = wet strength in Newtons/half inch width

| GPAM | Wet Strength vs time | | | % loss at |
|---|---|---|---|---|
|  | 3 sec | 30 sec | 2 hour | 2 hours |
| 1194 | 4.97 | 4.86 | 2.19 | 56 |
| Example 5 1.25:1 | 7.97 | 7.56 | 3.30 | 59 |

WS = wet strength in Newtons/half inch width

The above GPAM resins of the current disclosure obtained higher wet strength. Wet-strength decay remained good and was better than a control sample. The dry strength also improved. The samples reached higher levels of reactivity but were stable during glyoxalation and would not need to be monitored. As the ratio of glyoxal to acrylamide groups decreased there was a great rise in the flow viscosity during glyoxalation, but the rate of viscosity increase was still low compared to previous GPAM resins. The difference was consistent with the increasing RW value. The GPAM resins of this disclosure were again safer to use than the control sample which had a safety factor of about 1.

The samples of this example were also tested for ageing stability. The aqueous GPAM resin compositions were all adjusted to 8% solids and equal amounts were placed in clean sealed jars. The samples were then held at 50° C. for up to 9 days. The flow viscosity was monitored versus ageing time in days. The following table shows the effect of ageing on the flow viscosities of the samples.

| Day | 1194 | 1.7X | 1.5X | 1.25X |
|---|---|---|---|---|
| 0 | 9 | 11 | 12 | 11 |
| 1 | 9 | 11 | 12 | 11 |
| 2 | 9 | 11 | 12 | 11 |
| 5 | 11 | 11 | 11 | 9 |
| 6 | 12 | 9 | 12 | 7 |
| 7 | 12 | 9 | 10 | 6 |
| 8 | 19 | 8 | 10 | 6 |
| 9 | 114 | 8 | 10 | 6 |

The control sample started showing a rapid increase of flow viscosity after 8 days, whereas the new GPAM resins did not show any increase of viscosity with ageing.

The reactivity in meq/g before and after ageing for 9 days was measured. The changes are listed in the following table.

| Day | 1.7X | 1.5X |
|---|---|---|
| 0 | 2.37 | 2.24 |
| 9 | 2.47 | 2.42 |

For the new resins the method showed a slight increase of aldehyde functionality on the polymer.

Samples were also aged at 10% solids and 40° C. The changes in flow viscosity and residual glyoxal level are shown in the following table.

| | 1.7X | | | 1.5X | | | 1.25X | | |
|---|---|---|---|---|---|---|---|---|---|
| Day | Flow Visc. | Visc. cps | glyoxal level | Flow Visc. | Visc. cps | glyoxal level | Flow Visc. | Visc. cps | glyoxal level |
| 0 | 18 | 17.2 | 0.83 | 17 | 16.7 | 0.82 | 29 | 37.4 | 0.59 |
| 1 | 18 | 17.4 | — | 18 | 16.7 | — | 29 | 36 | — |
| 7 | 26 | 20.2 | — | 24 | 17.8 | — | 34 | 32.7 | — |
| 14 | 29 | 23 | 0.96 | 24 | 19.1 | 0.94 | 30 | 27.9 | 0.71 |
| 21 | 28 | 21.4 | 0.98 | 25 | 18.7 | 0.97 | 30 | 25.6 | 0.7 |
| 31 | 28 | 24.2 | 1 | 25 | 19 | 0.94 | 26 | 22.4 | 0.79 |
| 61 | 47 | 42.5 | 1.13 | 32 | 24.1 | 1.31 | 30 | 21.7 | 1.07 |

Where a previous GPAM resin is known not to last more than about 30 days in hot weather, such as 32° C., the current GPAM resins showed very little viscosity increase after 31 days at 40° C. and even after 61 days the viscosity increase was small or nearly zero for the third resin. Likewise, the level of glyoxal generated from reversal of the glyoxalation reactions was relatively small. This was unexpected and inventive. In various embodiments, the aqueous composition includes about 10 wt % of the cationic resin at a pH of about 3.2 and exhibits less than about a 30%, 25%, 20%, 15%, 10%, etc., increase in free glyoxal equivalents after ageing at about 40° C. for about 30 days.

Example 6—Reaction Window

Following similar procedures of the above examples various prepolymers were made and glyoxalated. Some were stable during the glyoxalation process and others were not. The reaction window is defined by the results.

| sample | 6A | 6B | 6C | Example 2 |
|---|---|---|---|---|
| Composition (AM:DADMAC) | 94:6 | 80:20 | 80:20 | 80:20 |
| Prepolymer RSV | 0.098 | 0.134 | 0.169 | 0.114 |
| Prepolymer solids at beginning of reaction | 7.94 | 7.93 | 6.60 | 8.37 |
| Ratio of glyoxal to acrylamide groups | 0.4 | 0.56 | 1.5 | 1.5 |
| Reaction Time (min.) | 144 | 78 | 82 | 360 |
| Flow Viscosity at start | 3 | 3 | 5 | 4 |
| Flow Viscosity when reaction stopped (before pH reductions) | 20 | 33 | 33 | 6 |
| accelerating quickly | Yes | Yes | Yes | No |
| RW | 0.19 | 0.25 | 0.126 | 0.073 |

| sample | Example 1 | 6D | 6E | 6F |
|---|---|---|---|---|
| Composition (AM:DADMAC) | | 80:20 | 80:20 | 80:20 |
| Prepolymer RSV | 0.118 | 0.109 | 0.146 | 0.130 |
| Prepolymer solids at beginning of reaction | 7.8 | 7.02 | 6.60 | 6.6 |
| Ratio of glyoxal to acrylamide groups | 0.4 | 0.8 | 1.5 | 1.5 |
| Reaction Time (min.) | | 300 | 360 | 360 |
| Flow Viscosity at start | | 3 | 5 | 5 |
| Flow Viscosity when reaction stopped (before pH reductions) | | 6 | 48 | 14 |
| accelerating quickly | | No | No | No |
| RW | 0.27 | 0.10 | 0.094 | 0.074 |

The samples in the above table exemplify that when the reaction window was greater than about 0.1 the samples showed significant increases in flow viscosity during the glyoxalation process and in many cases were stopped at a shorter glyoxalation time. The defined reaction window is not perfect, but serves as a guide.

Example 7—Reaction Window

Following similar procedures of the above examples various prepolymers were made and glyoxalated. Some were stable during the glyoxalation process and others were not. The reaction window is defined by the results.

| Sample | 7A | 7B | 7C | 7D | 7E |
|---|---|---|---|---|---|
| Composition (AM:DADMAC) | 80:20 | 80:20 | 80:20 | 80:20 | 80:20 |
| Prepolymer RSV | 0.140 | 0.157 | 0.157 | 0.157 | .223 |
| Prepolymer solids at beginning of reaction | 6.12 | 4.68 | 5.30 | 6.12 | 5.62 |
| Ratio of glyoxal to acrylamide groups | 1.5 | 1.2 | 1.5 | 1.5 | 2 |
| Reaction Time (min.) | 293 | 360 | 360 | 101 | 153 |
| Flow Viscosity at start and end | 5 | 4 | 5 | 5 | 7 |
| Flow Viscosity when reaction stopped (before pH reductions)Viscosity increase | 47 | 6 | 15 | 44 | 44 |
| accelerating quickly | No | No | No | Yes | Yes |
| RW | 0.080 | 0.096 | 0.087 | 0.101 | 0.140 |

Example 8—Comparison of Temporary Wet Strengths of GPAM Resins

The same procedure described above was used for testing paper additives that imparted wet strength. For each example the level of GPAM added to the paper was 0.35% on a dry basis.

| Sample | WS @ 3 sec | WS @ 30 sec | % loss @ 30 sec | WS @ 2 hours | % loss @ 2 hours |
|---|---|---|---|---|---|
| commercial 1194 | 3.76 | 3.52 | 6.4 | 1.67 | 55.6 |
| 8A | 4.78 | 4.44 | 7.1 | 2.13 | 55.4 |
| 8B | 5.50 | 4.86 | 11.6 | 2.82 | 48.7 |
| 8C | 4.83 | 4.47 | 7.4 | 2.28 | 52.8 |
| Commercial 1194 | 3.89 | 3.71 | 4.6 | 1.89 | 51.4 |
| 8D | 5.28 | 4.75 | 10.4 | 2.15 | 59.3 |
| 8E | 5.89 | 5.27 | 10.5 | 2.62 | 55.5 |

WS = wet strength in Newtons/half inch width

Example 9

As noted above there is an alternate process for the preparation of the GPAM resins of this disclosure. In the alternate process there is at the start of the glyoxal reaction with the acrylamide polymer a large excess of glyoxal to acrylamide groups on the polymer. This is achieved by adding the polymer slowly to a glyoxal solution rather than adding the glyoxal to the polymer solution. As a result, during most of the reaction process a high percentage of prepolymer obtains near or at its maximum level of reaction with the glyoxal while at the same time there is minimum crosslinking. The reaction may be stopped shortly after the addition of the polymer is complete or it may be carried to further completion as is possible while maintaining the aim of the current disclosure. It was found unexpectedly that for a given polymer RSV and ratio of glyoxal to acrylamide groups there was less build in flow viscosity during this process than when glyoxal was added to the polymer solution.

Furthermore, in another aspect of the current disclosure and this alternative process, the addition of two different prepolymers can be used where the initial prepolymer added to the glyoxal when there is still a high level of unreacted glyoxal can have a higher RSV and a second prepolymer with a lower RSV is added as the level of excess glyoxal is declining due to reaction with the first prepolymer. By adding a lower RSV polymer later in the process there less crosslinking and thus flow viscosity build occurs. In another aspect, a polymer is added near the end of the reaction to use up excess glyoxal. In another aspect of the alternate process at least 50% or at least 60% of reaction of glyoxal with acrylamide groups will occur before all of the polymer has been added.

The advantages and SF of all of the compositions described early are realized in the alternate process, but the range of the RSV of the prepolymer becomes greater.

As in above examples a acrylamide polymer was prepared. It contained 80 mole % acrylamide and 20 mole % DADMAC. The RSV of the polymer was 0.140 dL/dry g.

Sample A

A glyoxalation procedure similar to above examples was performed with a ratio of moles of glyoxal to moles of acrylamide groups on the starting polymer of 1.50. The glyoxal was added quickly to the polymer solution. The prepolymer solids, as defined in the RW, at the start of the glyoxalation reaction, after all of the glyoxal was added, was 6.12%. The RW was 0.08. During the reaction the flow viscosity increased from 5 to 47 and was continuing to increase with reaction time. The reaction was stopped after 4 hours and 53 minutes to avoid gelation of the reaction solution. The reaction was stopped by lowering the pH to 3.2 with a sulfuric acid solution.

Sample B

An alternate glyoxalation procedure was then used. A 25% polymer solution was prepared and no pH adjustment was made. 302.8 g of a 6.33% glyoxal solution was placed in a reaction flask. pH was adjusted to 8.8 with a 10% NaOH solution. The reaction flask was kept at 22° C. and the pH was monitored. During the reaction the pH was maintained at 8.9 with steady additions of 10% NaOH solution. Slowly and at a constant addition rate 100 g of the polymer solution was added to the glyoxal solution over 2.5 hours. The reaction was continued after all of the polymer was added and was finally stopped after 5 hours by lowering the pH. The flow viscosity was periodically measured. The reaction was then held at 22° C. and pH was maintained at 8.9 during the entire reaction. During the entire reaction time the flask was stirred. The viscosity increased over the 5 hour reaction time from 3 to 19. The RW prepolymer solids was 6.12%.

Each reaction product was membrane filtered to remove excess glyoxal. The final GPAM samples were tested by using them in the preparation of paper samples, as in previous examples. The paper samples were then evaluated for temporary wet-strength properties and the results are provided in the following table.

| sample | method | Flow Viscosity build during | 3 second wet strength | 30 second wet strength | 2 hour wet strength |
|---|---|---|---|---|---|
| 9A | glyoxal to polymer | 5 to 47 | 4.64 | 3.64 | 1.93 |
| 9B | polymer to glyoxal | 3 to 19 | 4.80 | 4.14 | 2.02 |

The alternate method of glyoxalation resulted in less flow viscosity build during the glyoxalation process, allowing for a greater latitude in the process—for example the option of running the reaction and creating a final polymer solution at a higher solids or for example the option of lowering the ratio of glyoxal to acrylamide groups. The alternate process where polymer was added to the glyoxal also resulted in a GPAM resin that gave an initial wet strength similar to the process where the glyoxal was added to the polymer.

Example 10

A polymer with 80 mole % acrylamide and 20% DADMAC was prepared. The RSV was 0.169 dL/dry g. To glyoxalate this polymer with a ratio of 1.5 glyoxal to acrylamide and at a RW solids of 6.6% by the methods described earlier where glyoxal is added to the polymer solution would be difficult as shown in examples 6. The RW value was 0.123. During the glyoxalation the reaction was stopped after 82 minutes as the flow viscosity rose from 5 to 33 seconds. The glyoxalation was repeated by instead of adding the glyoxal to the polymer the polymer solution was added slowly to the glyoxal solution by the same process described in example 9. The polymer was added over 2.5 hours and the reaction was continued for an additional 1.5 hours. The prepolymer and reaction solids were the same based on the concentration of the polymer (as if unreacted) at the time all of the polymer was added. With the reverse process the flow viscosity rose from an initial value of 2 to a final value of 11 seconds. A polymer that could not be easily glyoxalated when glyoxal was added to the polymer was easily glyoxalated when the polymer was added to the glyoxal.

During the time of the reaction the flow viscosity, as measured in previous examples, increased very little in the first 2.5 hours and then increased more rapidly. After 4 hours the viscosity rose from an initial value of 3 to 40. In example 6 a very similar reaction run with the method of glyoxal added to the polymer was stopped after 82 minutes because the viscosity was increasing rapidly. The alternate process allowed for a great extent of reaction.

The GPAM produced by the reverse process was filtered through a membrane to reduce residual glyoxal level and was then used as an additive in making paper by the same methods described in the examples above. The GPAM made by the alternate process was compared to a commercial product Hercobond™ 1194 resin from Solenis. The paper wet-strength values are shown in the following table.

| GPAM | Relative Wet Strength vs time | | | % loss at |
| | 3 sec | 30 sec | 2 hour | 2 hours |
|---|---|---|---|---|
| Control | 4.19 | 3.66 | 1.99 | 52 |
| Example 10 | 5.42 | 4.48 | 2.12 | 61 |

WS = wet strength in Newtons/half inch width

The alternate glyoxalation process allowed for better glyoxalation of an acrylamide polymer with a higher molecular weight (higher RSV) and yielded a product that provided excellent initial and temporary wet-strength performance.

Example 11

For membrane separation of a GPAM resin, a VSEP series L unit with NP010 (Microdyn Nadir™, polyethersulfone, 1000 Da nominal molecular weight cutoff) membrane was used. Both were available from New Logic Research, Inc., Minden, NV. The detailed procedures for this equipment are set forth in the operating manual provided by New Logic International (Version 2.1; Dated 3/96) which is expressly incorporated herein by reference in its entirety. The contents of the feed tank were cooled continuously to maintain temperature between 20° C. and 25° C. A pH probe was also inserted into the feed tank, and 10 wt. % sulfuric acid was added dropwise to the feed tank as needed to maintain pH between 3.0 and 3.8. The process began with 15 kg of the GPAM resin at 2 wt. % solids in the feed tank. The GPAM resin was Hercobond™ Plus 555 dry-strength additive (available from Solenis, which is manufactured according to the procedure of Example 1 in U.S. Pat. No. 7,875,676). The VSEP unit was started, and operating pressure was maintained at 400 psi. Permeate was removed to concentrate solids in the feed tank, while maintaining temperature and pH of feed tank. Weight of permeate collected was recorded continuously. The feed tank was concentrated to 4 wt. % solids. A sample of permeate was collected before disposing of the remainder, and the feed solution was set aside. Another 15 kg of the GPAM resin at 2 wt. % solids was added to the feed tank and was concentrated to 4 wt. % solids in the same manner described previously. The two GPAM resin solutions at 4 wt. % solids were then combined in the feed tank, and a sample of GPAM resin solution was collected.

Then, this GPAM resin solution was concentrated from 4 wt. % to 6 wt. % solids while maintaining temperature and pH. Again, operating pressure was 400 psi and weight of permeate collected was recorded continuously. Once the GPAM resin solution reached 6 wt. %, a sample of permeate was collected before disposing of the rest. A sample of 6 wt. % GPAM resin solution was also collected. The GPAM resin solution was then concentrated stepwise to 8 wt. % and 10 wt. % solids, following the same procedure used to concentrate GPAM resin solution from 4 wt. % to 6 wt. % solids, with collection of samples of permeate and GPAM resin solution.

The starting GPAM resin and the GPAM resin samples from the membrane separation were stabilized by adding 500 ppm of potassium sorbate (dry weight potassium sorbate for wet weight of GPAM resin) and adjusting to pH 3.2 with 10% aqueous sulfuric acid. The samples were then aged at 4° C., 25° C. and 32° C., using refrigerated storage for 4° C. and incubators for 25° C. and 32° C. (to have accurate temperatures). The viscosity stability was monitored by Brookfield viscosity at 25° C. For GPAM resin samples with a Brookfield viscosity of greater than 10 cps, a LV Series viscometer (available from Brookfield Engineering Laboratories, 11 Commerce Blvd., Middleboro, MA 02346) was used with spindle #1 at 60 rpm. For GPAM resin samples with a Brookfield viscosity of less than 15 cps, a UL adapted LV Series Brookfield viscometer maintained at 25° C. was used with a UL (00) spindle at 30 rpm.

The Brookfield viscosity and glyoxal results are detailed in the tables below. Cells without values indicates no measurement was taken.

| Nominal % Solids | Measured % Solids | Relative[c] % glyoxal | Initial viscosity | 3 days at 4° C. | 7 days at 4° C. | 14 days at 4° C. | 21 days at 4° C. | 28 days at 4° C. | 59 days at 4° C. |
|---|---|---|---|---|---|---|---|---|---|
| 2[a] | 2.18 | sm | 4.5 | — | — | — | — | — | 5.2 |
| 4[a] | 3.90 | 14 | 7.0 | — | — | 7.1 | — | — | 7.0 |
| 6[a] | 6.04 | 19 | 13.4 | — | 13.3 | — | — | — | — |
| 6[b] | 6.04 | 19 | 13.0 | — | 12.9 | 13.2 | — | 13.6 | 14.0 |
| 8[b] | 8.15 | 24 | 23.7 | 25.5 | 27.5 | 30.4 | 28.2 | 27.6 | 38.9 |
| 10[b] | 9.90 | 19 | 50.0 | 53.5 | 53.7 | 58.4 | 62.6 | 62.4 | 78.1 |

| Nominal % Solids | Measured % Solids | Relative[c] % glyoxal | Initial viscosity | 3 days at 25° C. | 7 days at 25° C. | 14 days at 25° C. | 21 days at 25° C. | 28 days at 25° C. | 59 days at 25° C. |
|---|---|---|---|---|---|---|---|---|---|
| 2[a] | 2.18 | sm | 4.5 | — | — | — | — | — | — |
| 4[a] | 3.90 | 14 | 7.0 | — | — | 7.5 | — | 7.9 | — |
| 6[a] | 6.04 | 19 | 13.4 | — | — | — | — | — | — |
| 6[b] | 6.04 | 19 | 13.0 | — | 14.0 | 15.6 | — | 26.3 | gel |
| 8[b] | 8.15 | 24 | 23.7 | 32.2 | 39.8 | 68.0 | gel | — | — |
| 10[b] | 9.90 | 19 | 50.0 | 66.8 | 134.5 | gel | — | — | — |

| Nominal % Solids | Measured % Solids | Rel.(c) % glyoxal | Init. Visc. 32° C. | 3 day at 32° C. | 7 day at 32° C. | Relative(c) % glyoxal after 7 days at 32° C. | 14 day at 32° C. | 21 day at 32° C. | 28 day at 32° C. | 59 day at 32° C. |
|---|---|---|---|---|---|---|---|---|---|---|
| 2(a) | 2.18 | sm | 4.5 | — | — | — | — | — | 5.3 | — |
| 4(a) | 3.90 | 14 | 7.0 | — | 7.3 | — | 8.0 | — | 9.1 | — |
| 6(a) | 6.04 | 19 | 13.4 | 15.1 | — | — | — | — | — | — |
| 6(b) | 6.04 | 19 | 13.0 | 14.4 | 15.7 | — | 23.3 | — | gel | — |
| 8(b) | 8.15 | 24 | 23.7 | 33.0 | 65.7 | 14 | gel | — | — | — |
| 10(b) | 9.90 | 19 | 50.0 | 104.4 | gel | — | — | — | — | — |

In the above, (a) means that a UL adapted, LV series, Brookfield viscosity was used to measure viscosity in cps using the 00 spindle at 30 rpm.

In the above (b) means that a LV series Brookfield viscosity was used to measure viscosity in cps using spindle 1 at 60 rpm.

In the above, (c) refers to values relative to initial Hercobond™ Plus 555 dry-strength additive (starting material, sm).

These results indicate that GPAM resins (e.g., Hercobond™ Plus 555 dry-strength additive) can be concentrated by membrane separation to remove glyoxal and still have a GPAM resin with gelation stability comparable to commercial GPAM resins. Concentration by membrane separation did not significantly decrease the amount of pendent reactive aldehyde functionality nor lead to a significant increase in residual glyoxal during ageing. These results also indicate that a diafiltration process could be used to decrease residual glyoxal and low molecular weight oligomers.

While at least one exemplary embodiment can have been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description tend to provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. An aqueous composition comprising:
water; and
a cationic glyoxalated polyacrylamide having at least one reactive aldehyde group and formed from the reaction of glyoxal and a polymer;
wherein the polymer comprises at least one acrylamide repeating unit and at least one cationic repeating unit;
wherein the extent of reaction of glyoxal with acrylamide groups of the polymer is such that at least 40 mole % of the acrylamide groups are converted to reactive aldehyde functionality;
the at least one cationic repeating unit is formed from one or more of the following: diallyldimethylammonium chloride (DADMAC), 2-(acryloyloxyethyl)-trimethylammonium chloride, 2-(dimethylamino)ethyl acrylate, 3-acrylamidopropyl-trimethylammonium chloride, dimethylaminopropyl acrylamide, or combinations thereof;
greater than about 60 mole % of the acrylamide repeating units of the polymer react with glyoxal;
a mole ratio of equivalents of reactive aldehyde groups in the composition versus equivalents of glyoxal in the composition is greater than about 1.5; and wherein
when the composition comprises about 10 wt % of the cationic glyoxalated polyacrylamide at a pH of about 3.2, the composition exhibits less than about 10 mole % loss of equivalents of reactive aldehyde groups after ageing at about 40° C. for about 30 days;
when the composition comprises about 10 wt % of the cationic glyoxalated polyacrylamide at a pH of about 3.2, the composition exhibits less than about 50% increase in viscosity after ageing at about 40° C. for about 30 days;
when the composition comprises about 10 wt % of the cationic glyoxalated polyacrylamide at a pH of about 3.2, the composition exhibits less than about a 30% increase in free glyoxal equivalents after ageing at about 40° C. for about 30 days; and
the composition has a solids content of at least about 14%.

2. The aqueous composition of claim 1 wherein the mole ratio of equivalents of reactive aldehyde groups in the composition versus equivalents of glyoxal in the composition is greater than about 2.

3. A process of forming the aqueous composition of claim 1 wherein the process has a reaction window that is less than about 0.14 and that is defined as at a time during the step of reacting as (polymer RSV)×(polymer RSV)×(solids of the polymer as defined in the reaction window) divided by the ratio of moles of glyoxal to moles of acrylamide groups of the polymer before glyoxalation occurs.

4. The process of claim 3 wherein a ratio of the RSV of the cationic glyoxalated polyacrylamide resin to the RSV of the polymer is less than 1.5.

5. A process for preparing the aqueous composition of claim 1, the method comprising the steps of:
polymerizing two or more monomers via free radical polymerization to form a polymer comprising at least one acrylamide repeating unit and at least one cationic repeating unit;
reacting the acrylamide groups of the polymer with glyoxal to form cationic glyoxalated polyacrylamide resin and optionally removing excess glyoxal, to form the aqueous composition;
wherein the step of reacting the polymer and the glyoxal occurs by the addition of a water mixture of the polymer to a solution of the glyoxal such that greater than 50 mole % of the polymer-glyoxal reaction that occurs does so before about 100% of the polymer in the polymer mixture is added to the glyoxal in the solution;
wherein a percentage of polymer-glyoxal reaction is defined as about the maximum percentage of acrylamide groups that react after about 8 hours of reaction time with glyoxal at about 22° C. and a pH of about 8.9, and wherein the reaction of the polymer and the glyoxal is continued after about 100% of the polymer in the solution is added to reach a level of glyoxalation such that at least about 40 mole % of the acrylamide repeating units of the polymer are converted to reactive aldehyde groups and wherein less viscosity increase occurs during the polymer-glyoxal reaction than if the solution of the glyoxal was added to the solution of the polymer.

6. The process of claim 5 wherein the step of reacting the polymer and the glyoxal occurs by the addition of a water mixture of the polymer to a solution of the glyoxal such that greater than about 65 mole % of the final polymer-glyoxal reaction occurs before about 100% of the polymer in the solution is added to the glyoxal mixture.

7. A process of forming paper, the process comprising the steps of:
   providing an aqueous suspension of cellulosic fibers;
   adding the aqueous composition of claim 1 to the suspension,
   forming the cellulosic fibers into a sheet; and
   drying the sheet to produce a paper having an initial wet tensile strength that is at least about 10% greater than a comparative paper.

8. The process of claim 7 wherein drying the sheet produces a paper having an initial wet tensile strength that is at least about 30% greater than a comparative paper.

\* \* \* \* \*